United States Patent [19]
Alaloof

[11] Patent Number: 6,125,478
[45] Date of Patent: *Oct. 3, 2000

[54] PROTECTION SYSTEM FOR THE RIDER OF A NON-ENCLOSED VEHICLE

[75] Inventor: Jacob Alaloof, Herzlia, Israel

[73] Assignee: Merhav-A.A.P. Ltd., Israel

[*] Notice: This patent is subject to a terminal disclaimer.

[21] Appl. No.: 08/986,260

[22] Filed: Dec. 5, 1997

Related U.S. Application Data

[63] Continuation-in-part of application No. 08/545,938, Oct. 20, 1995, Pat. No. 5,781,936.

[30] Foreign Application Priority Data

Mar. 22, 1995 [IL] Israel ......................................... 113081

[51] Int. Cl.[7] ..................................................... A41D 13/00
[52] U.S. Cl. ........................... 2/456; 2/DIG. 3; 280/728.1
[58] Field of Search ................................ 2/455, 456, 459, 2/463, 464, 465, 466, 467, 468, DIG. 3, 413, 425; 280/728.1, 730.1

[56] References Cited

U.S. PATENT DOCUMENTS 5,746,442  5/1998  Hoyaukin ............................. 280/730.1

FOREIGN PATENT DOCUMENTS

| 0 051 254 | 5/1982 | European Pat. Off. . |
|---|---|---|
| 195 45 854 | 6/1997 | Germany . |
| 197 28 130 | 1/1999 | Germany . |
| 1588919 | 4/1981 | United Kingdom . |
| 91/01658 | 2/1991 | WIPO . |
| 95/33389 | 12/1995 | WIPO . |
| 98/11793 | 3/1998 | WIPO . |

*Primary Examiner*—Michael A. Neas
*Attorney, Agent, or Firm*—Choate, Hall & Stewart

[57] ABSTRACT

A protective system including a garment-shaped inflatable member for surrounding at least upper portions of the body of a rider of a non-enclosed vehicle, and apparatus for exposing the interior of the inflatable member to the pressurized gas source for rapidly inflating the inflatable member in response to a sudden separation of the rider from the vehicle by at least a predetermined distance. The inflatable member has a garment-shaped configuration when in a non-inflated orientation, and when inflated, has an expanded, generally bulbous configuration such that large magnitude concentrated forces experienced thereby on impact with an object subsequent to the sudden separation of the rider from wherein the vehicle are prevented from transfer directly to the rider, thereby protecting the surrounded upper portions of the rider's body from serious injury.

15 Claims, 17 Drawing Sheets

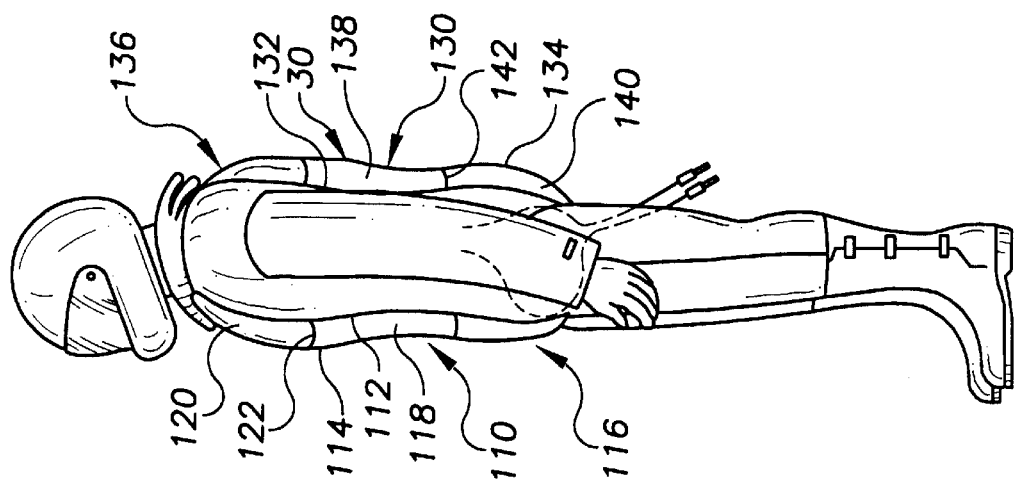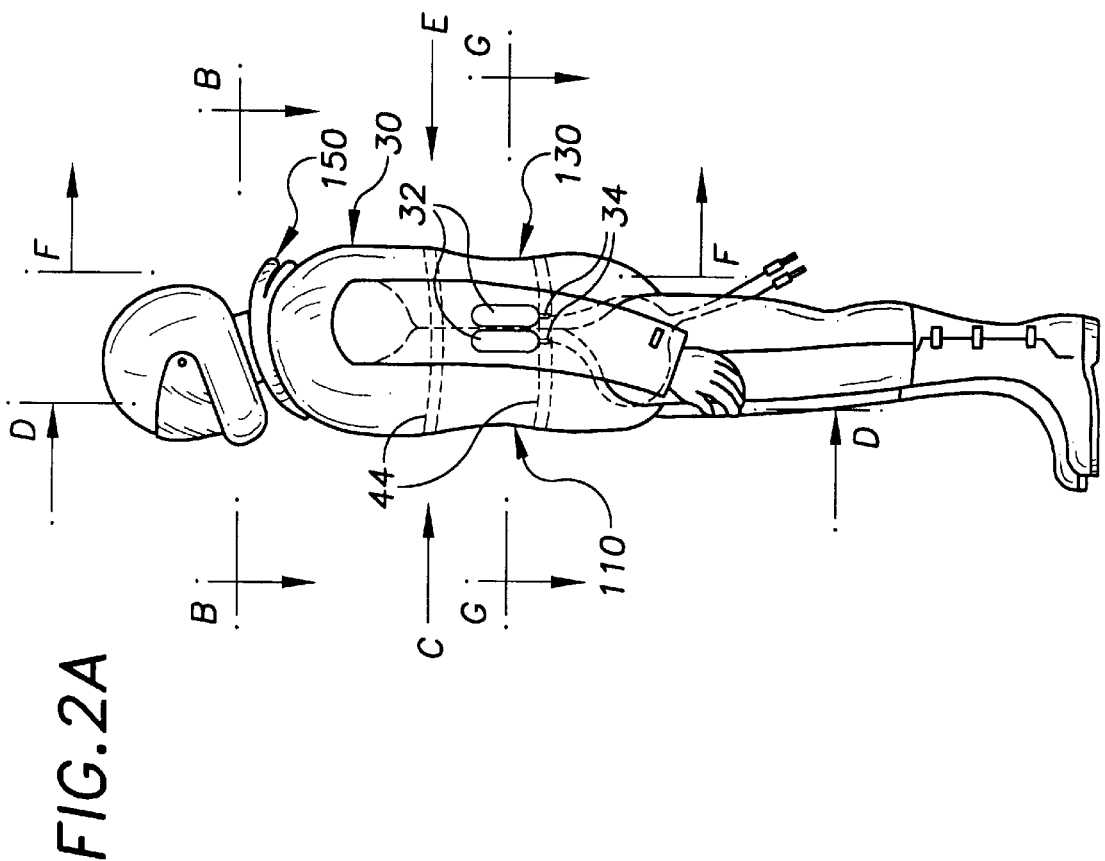

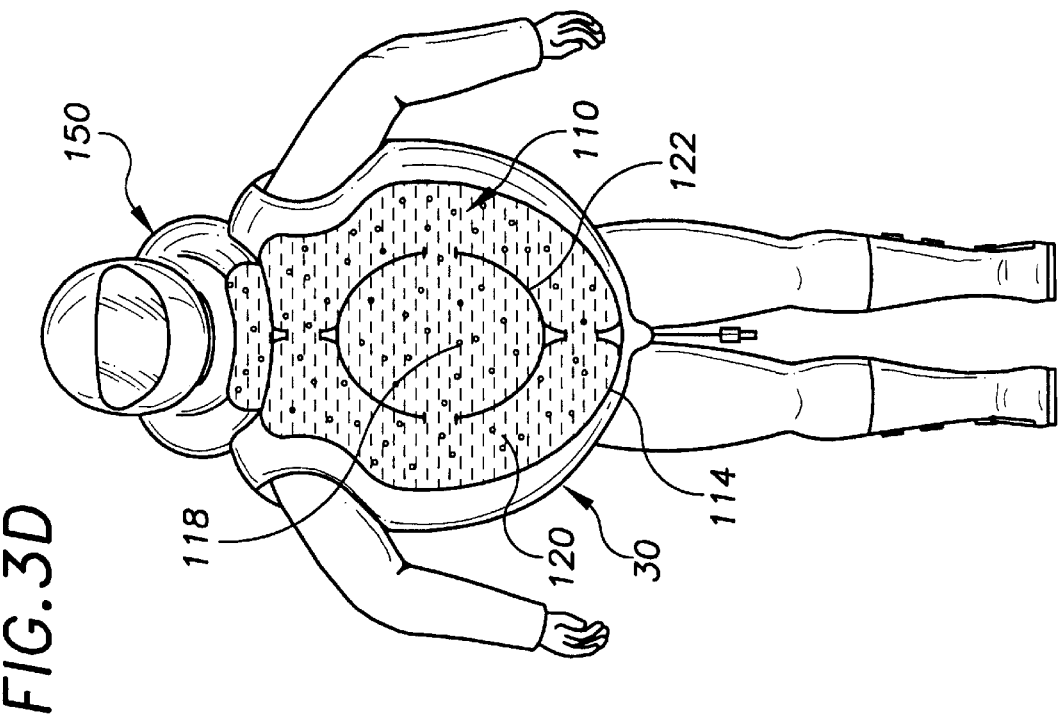
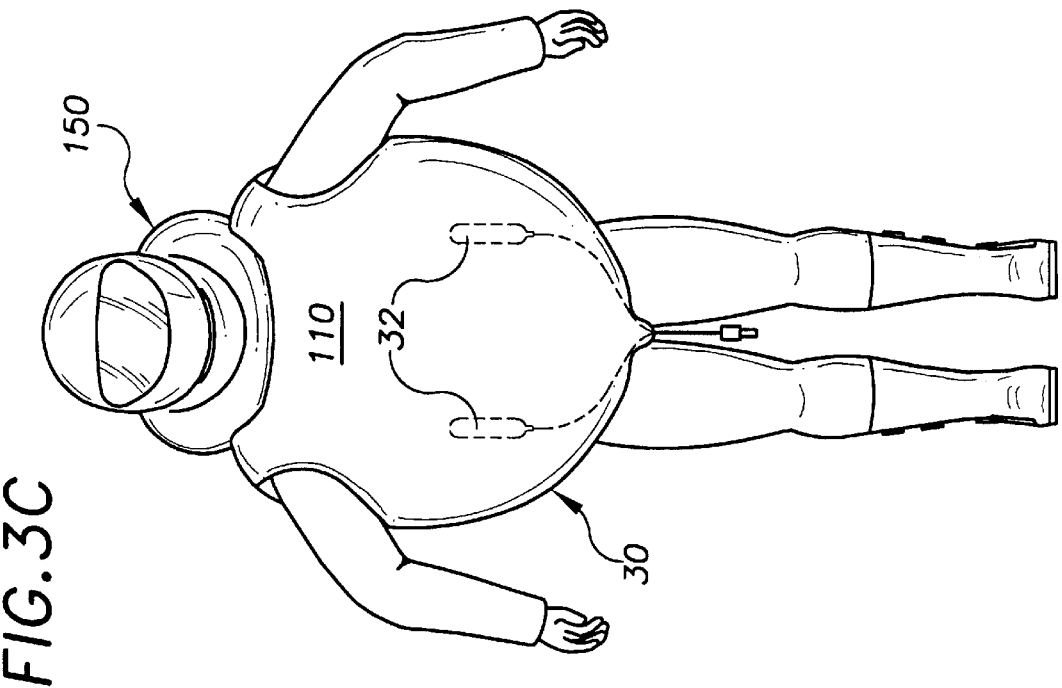

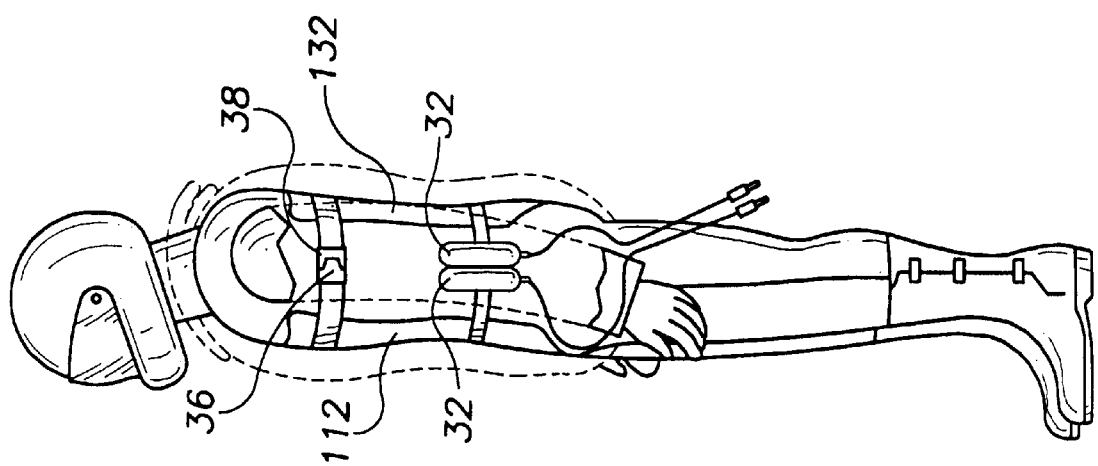
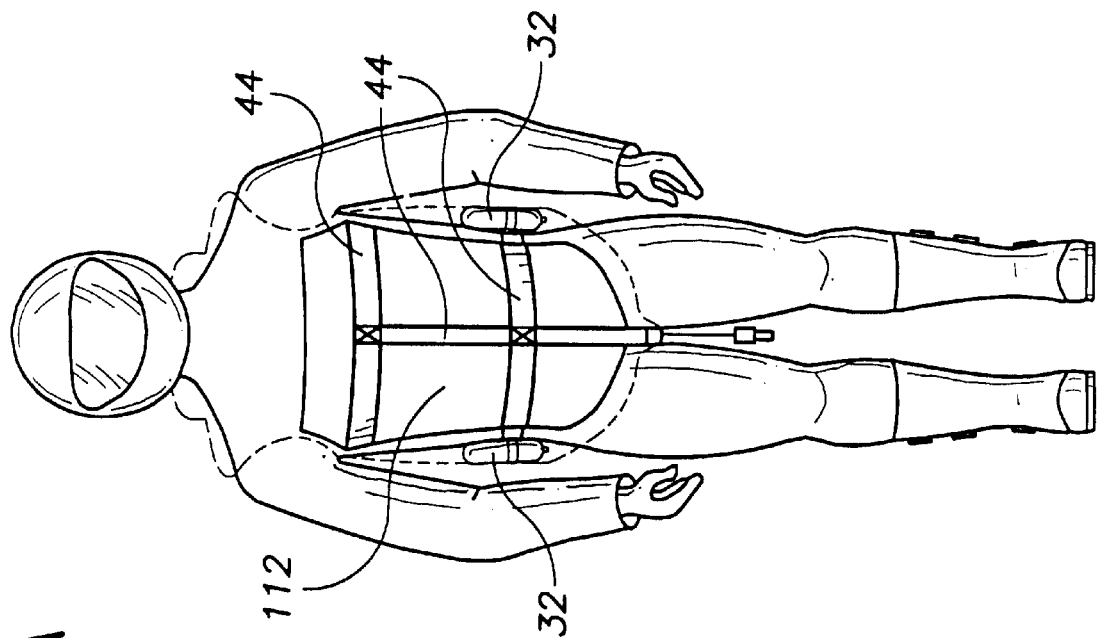

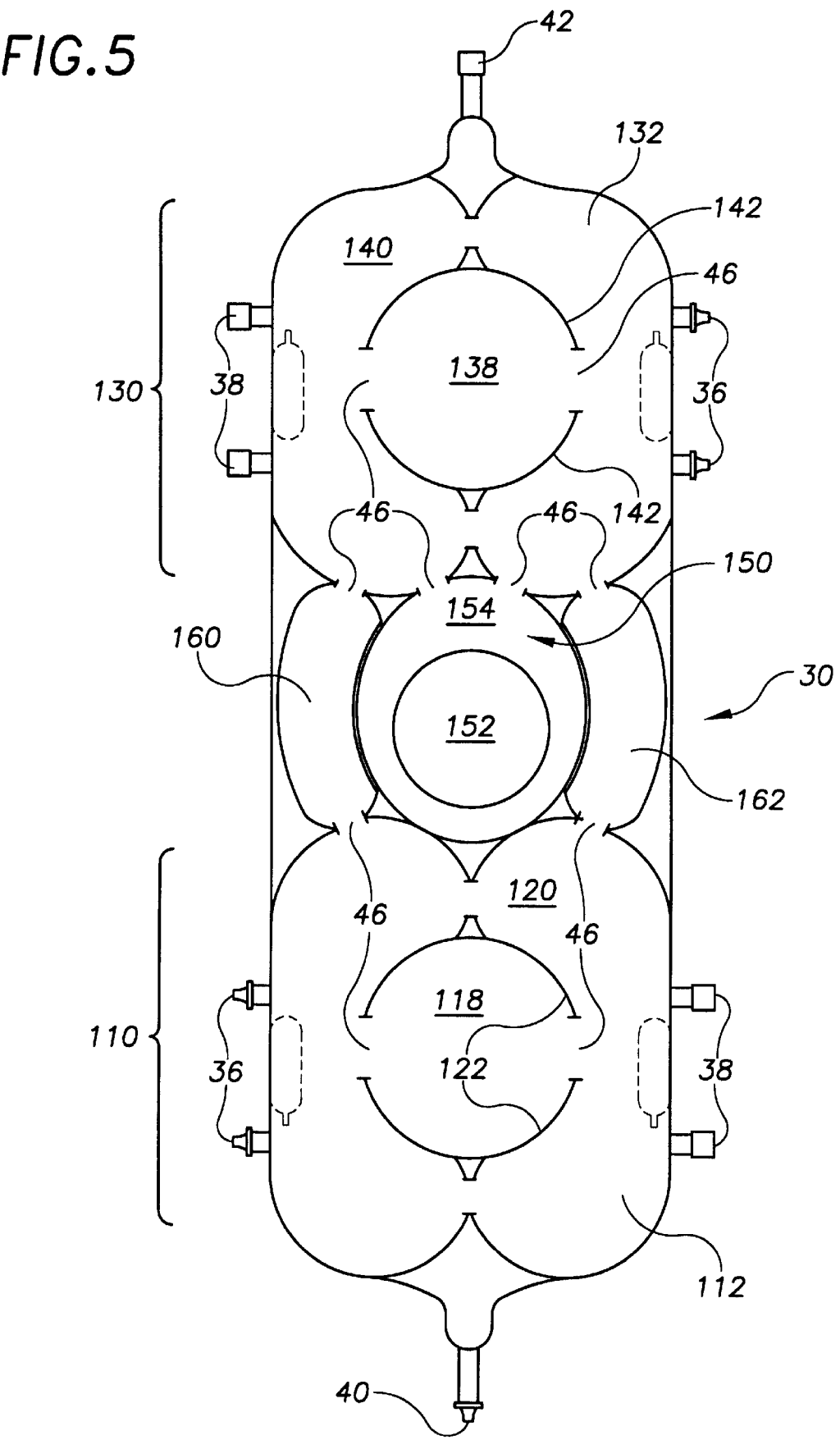

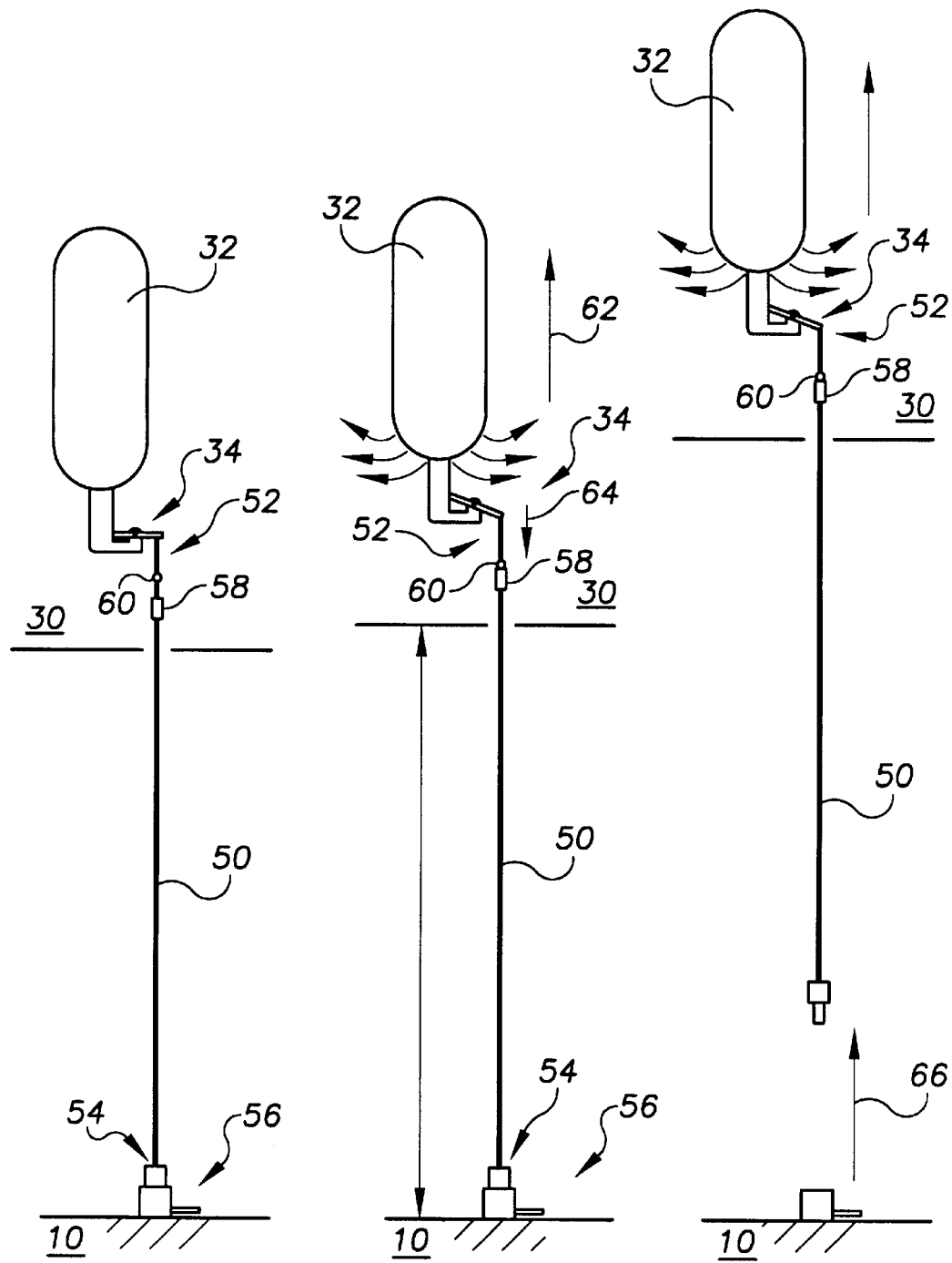

PROTECTION SYSTEM FOR THE RIDER OF A NON-ENCLOSED VEHICLE

RELATED APPLICATIONS

The present application is a Continuation-In-Part of application Ser. No. 08/545,938 filed Oct. 20, 1995 now U.S. Pat. No. 5,781,936.

FIELD OF THE INVENTION

The present invention relates to protective gear for users of non-enclosed vehicles, such as motorcycles.

BACKGROUND OF THE INVENTION

It is generally record that there is a greater risk of serious injury to motorcyclists in the case of an accident than to automobile passengers. This is due, inter alia, to the fact that, unlike automobiles, motorcycles are not equipped with protective systems which enclose users thereof. Accordingly, apart from injuries that may be caused to a motorcyclist by his colliding directly with a moving vehicle or stationary object, there is also a very high risk that, in the event of a collision between a motorcycle and either another vehicle or a stationary object, he will be thrown from the motorcycle. When this happens, the motorcyclist is liable to sustain fatal injuries or, at least, very serious damage to vital parts of the body, especially to the back, spine, neck and pelvis. This can result in very serious injury thereto, if not paralysis or death, This problem has been well recommended in the art, although no satisfactory solution has been proposed hitherto. An indication of the state of the art is found in a plurality of publications, as briefly described below.

French Patent Application No. 9107659, Publication No. 2,677,856, to Demarais, discloses a protective garment for a motorcyclist. The garment incorporates inflatable chambers preferably made of natural or synthetic rubber linked to a compressed air supply to protect the rider in event of a fall.

South African Patent Application No. 8409018 to Van Wyk discloses a safety garment for a motorcyclist. The garment is connected to a fluid pressure source and is adapted to inflate on deceleration of the vehicle or the wearer.

German Patent Application No. DE 3323701 to Hasse discloses a safety jacket for motorcyclists and pedestrians which is made of double-layered inflatable material with a rip cord.

UK Patent Application No. 2,099,687 to Sweeney discloses a protective garment for a motorcyclist, wherein the garment has compartments that are rapidly inflatable from a compressed gas source.

U.S. Pat. No. 4,059,852 to Crane discloses an inflatable suit for motorcyclists, wherein the suit has a pressurized gas supply associated with an ingress port. A valve associated with the gas supply is adapted for activation on an abrupt separation of the motorcyclist from his vehicle.

U.S. Pat. No. 4,984,821 to Kim at al. discloses a gas expansion type shock absorbing safety cloth including a shock absorbing tube, a gas regulator connected trough gas conduits to the shock absorbing tube, one or more compressed gas storage and discharge devices, an ignition controller actuated by the vehicle, a trigger device connected through an electric wire and a pull string to the ignition controller, and a connector disposed intermediate the electric wire and the pull string such that it is separated on application of force. In the event of an accident, the vehicle is often unable to provide actuation for the ignition controller.

The above publications are characterized, inter alia, by their disclosure of garments which inflate rapidly upon separation of a wearer from a motorcycle so as to provide cushioning to certain regions of the body. The inflated shape approximates to the non-inflated shape of the garment, although with some thickening in places. Accordingly, while some protection may be provided by the garment upon inflation thereof, there occurs relatively little redistribution of the forces experienced upon impacting the ground after a person is propelled from his motorcycle, and thus little significant protection against direct impact forces is provided thereby. Accordingly, impact forces are not necessarily reduced significantly enough so as to prevent serious or fatal injuries to a wearer, as described above.

UK Patent No. 1,479,733 to Bothwell discloses a protective garment designed to cushion the body of the wearer against impact. The garment inflates to a large ball, with a gap between the front bag and the wearer's face to enable the wearer to breath freely, but which thereby prevents immobilization of the neck of the wearer. Inflation is initiated by an electric pulse generated by the motorcycle at the time the wearer falls off.

U.S. Pat. No. 4,637,074 to Taheri discloses an inflatable garment, for use in a vehicle such as an automobile, for protecting against collision related injury.

SUMMARY OF THE INVENTION

The present invention seeks to provide a protective system for riders of non-enclosed vehicles, and other non-enclosed means of transportation, such as horseback riding. The protective system is in the form of a garment which is automatically inflated to a force dissipating or deflecting shape in response to unintentional separation of the rider from his vehicle.

There is thus provided, in accordance with the invention, a protective system including a garment-shaped inflatable member for rounding at least upper portions of the body of a rider of a non-enclosed vehicle and including at least a first inflatable portion for covering and protecting front and rear portions of the body and at least a second inflatable portion for covering and protecting at least the rider's upper spine, a source of pressurized gas incorporated in the inflatable member, and means for exposing the interior of the inflatable member to the pressurized gas source for rapidly inflating the inflatable member in response to a sudden separation of the rider from the vehicle by at least a predetermined distance. The means for exposing includes a connector for selectably connecting and disconnecting the inflatable member and the vehicle including a frangible element, wherein, in response to a sudden separation of the rider from the vehicle operative to apply at least a predetermined force to the connector, the connector is operative to transmit the force, first, to the gas release means so as to cause operation thereof so as to inflate the inflatable member, and subsequently, to the frangible element, thereby to cause disengagement thereof from the vehicle, thereby permitting disconnection of the inflatable member from the vehicle, gas release means associated with the pressurized gas, and electromechanical operating means associated with the gas release means and the connector, including mechanical means responsive to a sudden separation of the rider from the vehicle by at least a predetermined distance to actuate means for providing an electric current to activate the gas release means so as to inflate the inflatable member and so as also to disconnect the inflatable member from the vehicle. In particular, the inflatable member has a garment-shaped configuration when in a non-inflated orientation, and when inflated, has an expanded, generally bulbous configuration such that large magnitude concentrated forces experienced thereby on impact with an object subsequent to the sudden separation of the rider from the vehicle are prevented from transfer directly to the rider, thereby protecting the surrounded upper portions of the rider's body from serious injury.

According to one embodiment of the invention, the source of pressurized gas includes a pyrotechnic gas generator.

According to a preferred embodiment of the invention, the source of pressurized gas includes a hybrid gas generator.

BRIEF DESCRIPTION OF THE DRAWINGS

The present invention will be more fully understood and appreciated from the following detailed description taken in conjunction with the drawings, in which:

FIG. 2A is a side view of a motorcyclist wearing the system of the invention, wherein the system is in a non-inflated orientation;

FIG. 2B is a view similar to that of FIG. 2A, but wherein the protective system is seen in side-sectional view, taken along line B—B in FIG. 2A;

FIGS. 3A–3G are views of a motorcyclist wearing the system of the invention, similar to the views of FIGS. 2A–2F, but wherein the system is seen in an inflated orientation;

FIGS. 4A and 4B are respective front and side illustrations of the system of the invention in a non-inflated orientation and being worn by a wearer, wherein the exterior of the system is cut away so as to show the interior thereof;

FIG. 5 is a schematic diagram of the system of the invention in a spread-out position, illustrating the intercommunicating inflatable chambers of the system;

FIGS. 6A, 6B and 6C are schematic illustrations of the inflation and release mechanism of the system of the invention;

DETAILED DESCRIPTION OF A PREFERRED EMBODIMENT

Figure 1:
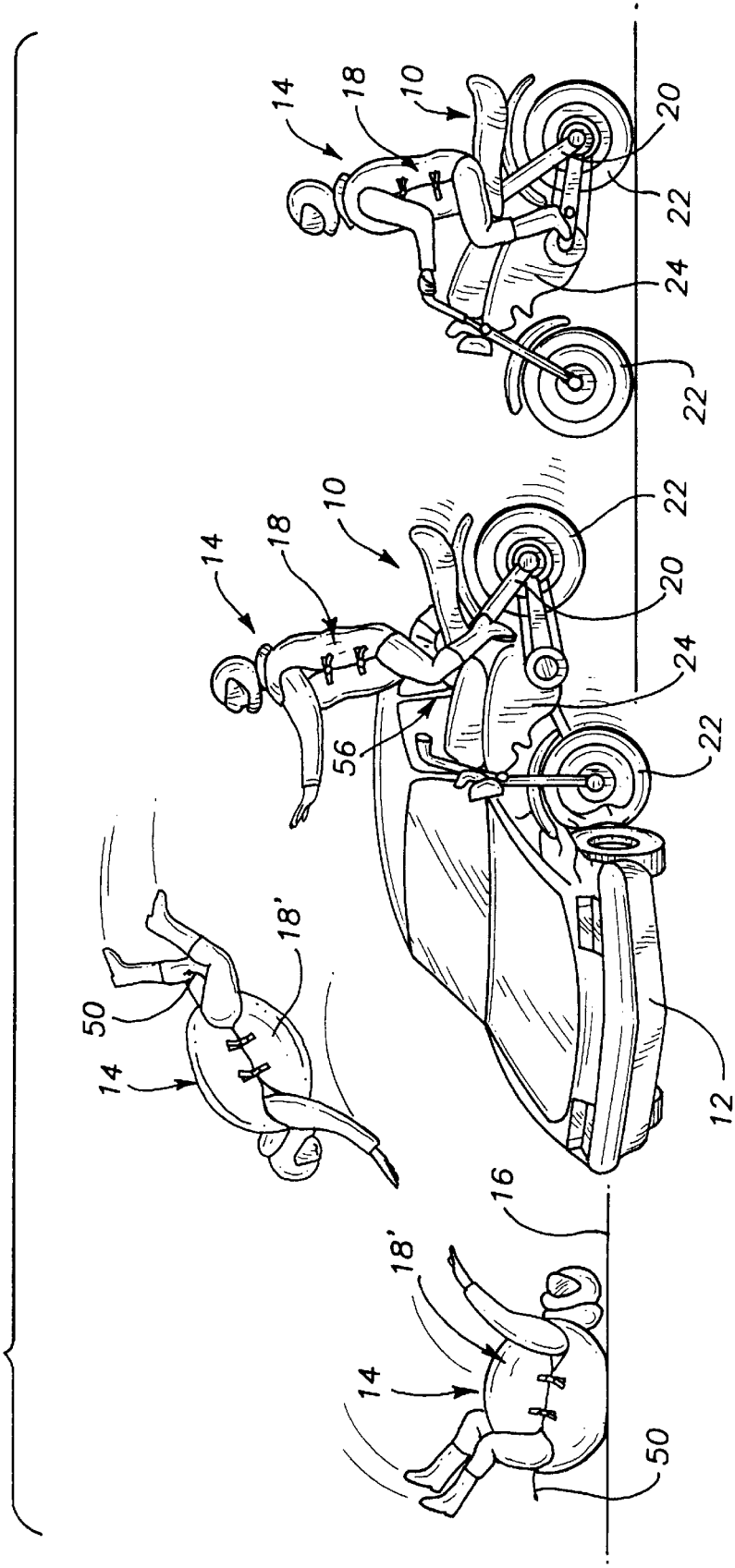
FIG. 1 is a pictorial illustration of a collision between a motorcycle and an automobile, wherein the motorcyclist is protected by the protective system of the present invention.
Figure 2D:
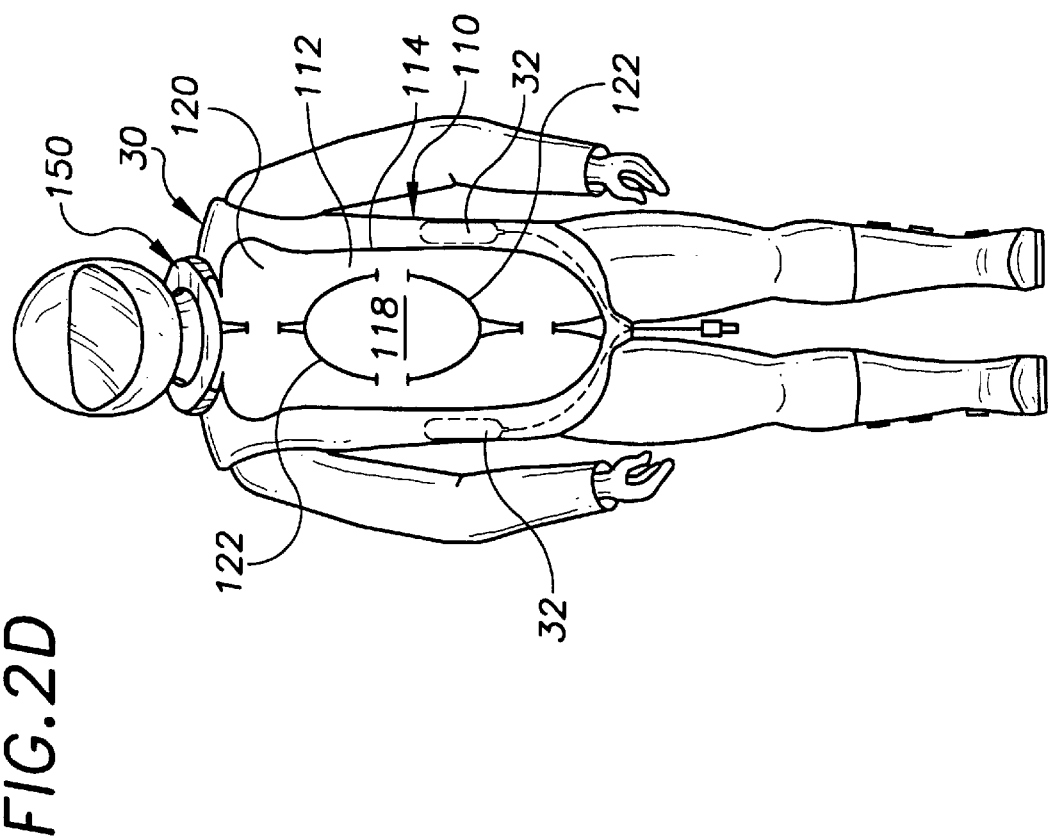
FIG. 2D is a partially cut-away front view of the system of FIG. 2A, taken along line D—D therein.
Figure 2C:
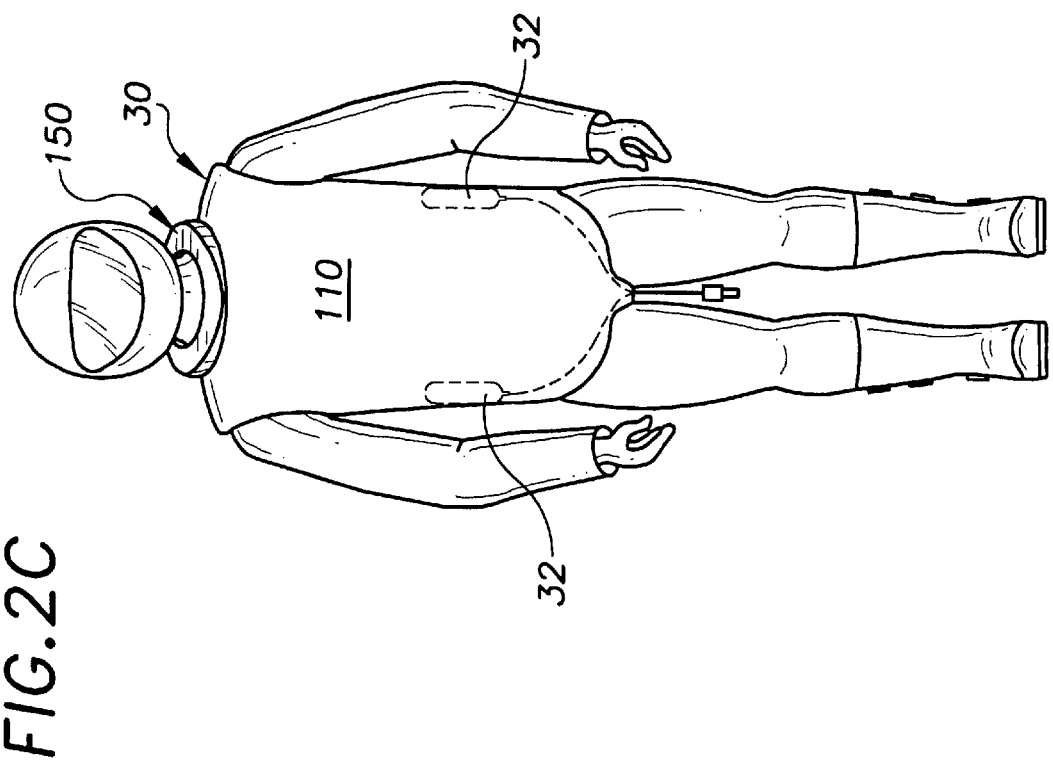
FIG. 2C is a front elevation of the motorcyclist and system of FIG. 2A, taken in the direction of arrow C therein.
Figure 2F:
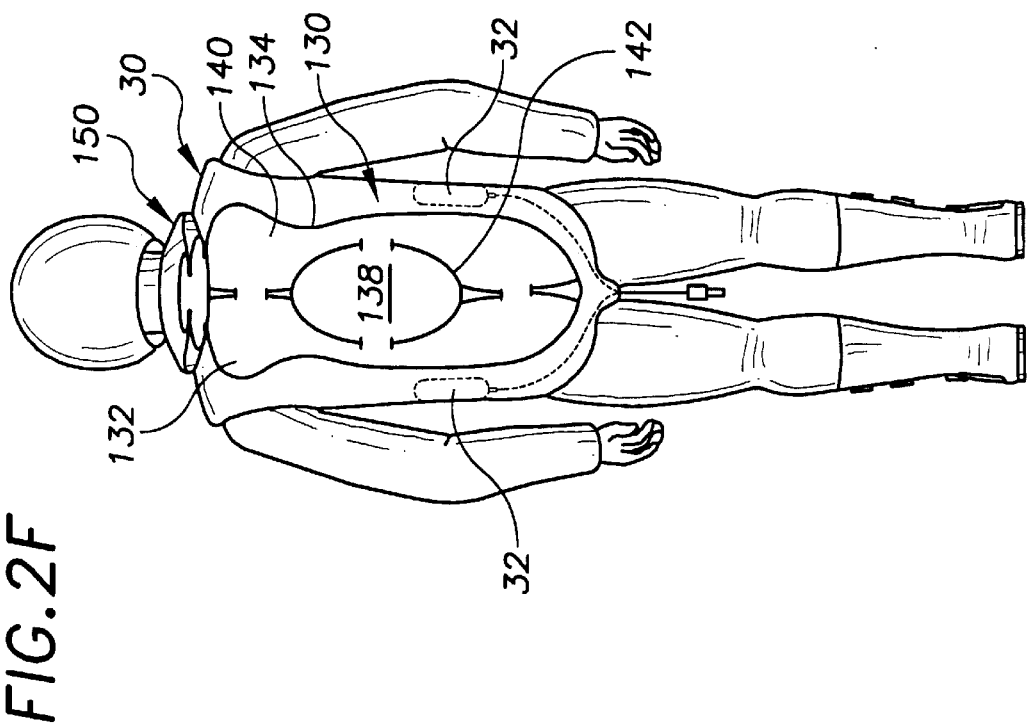
FIG. 2F is a partially cut-away rear view of the system of FIG. 2A, taken along line F—F therein.
Figure 2E:
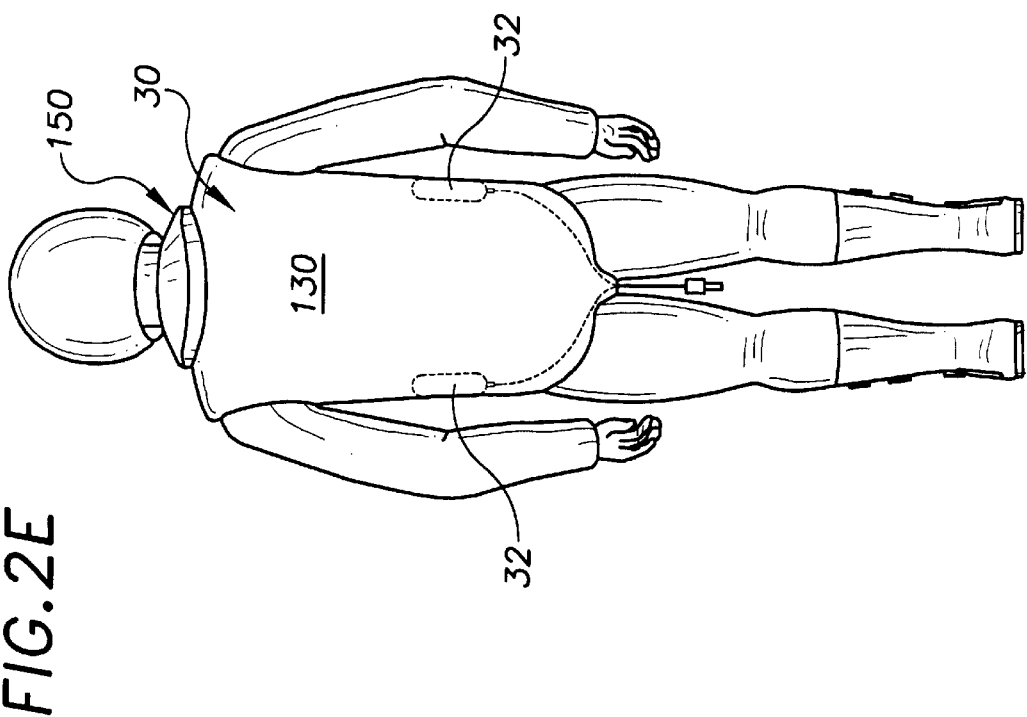
FIG. 2E is a rear elevation of the motorcyclist and system of FIG. 2A, taken in the direction of arrow E therein.
Figure 2G:
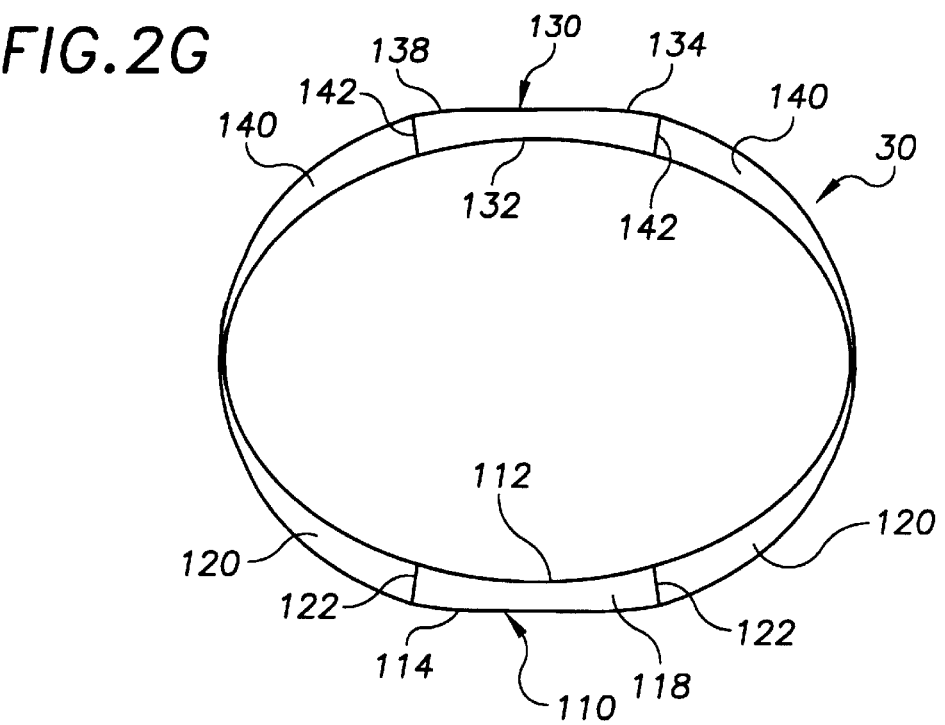
FIG. 2G is a lateral cross-section of the protective system of FIG. 2A, taken along line G—G therein.

Reference is now made to FIG. 1, wherein there is illustrated a collision between a non-enclosed vehicle, referenced 10, such as a motorcycle, and an automobile, referenced 12. It is seen that in the side-on collision, the motorcyclist, referenced 14, is ejected from the motorcycle 10, and is projected through the air until landing on a ground surface 16 on his back. Unprotected, such an occurrence could be sufficient to cause serious injuries to the neck and back of the motorcyclist, in many cases either killing him or leaving him with permanent disabilities. As will be appreciated by persons skilled in the art, among portions of the body that are most susceptible to permanent injury and even fatality, are the neck, back and pelvis.

The present invention thus provides a protective system, referenced 18, which is adapted to be worn as an outer garment and which, upon a sudden separation of the rider from his vehicle, such as is caused by a collision with another vehicle or a stationary object, for example, immediately inflates. In the inflated position, the system is indicated 18'. By the time the rider lands, his entire upper body, from his pelvis to his neck, is encased in a protective balloon-shaped cushion which operates to protect the rider from serious injury as described. This is achieved by deflection of some portion of the impact forces, and by spreading or distributing the remainder over substantially the entire protected portions of the body, thereby preventing transfer of concentrated large forces to specific portions of the body.

While, as described above, in the BACKGROUND OF THE INVENTION, various attempts have been made in the art to provide rapidly inflating cushioning devices for motorcyclists, these are all characterized by the provision of relatively thin cushioning which cannot properly either deflect or disperse impact forces.

In contrast to the prior art, the present invention utilizes the natural properties of rounded or spherical objects which, as a result of their shape, tend to be at least partially deflected from a surface upon impact therewith, thereby, in turn, to also deflect a major portion of the impact forces away from the rider. The massiveness of the inflated form of the protective system of the present invention also ensures that, once the system has been inflated, any remaining forces are spread over a much larger area of the body, as described above and, further, the neck and back are supported to the extent of being fixated, thereby preventing undesired movement of the neck and spine of an injured rider in the absence of paramedical or medical personnel.

It will be appreciated that, while the system of the present invention is intended primarily as a protective garment that is essentially an add-on system, the system requires installation on the vehicle and operates in conjunction with the vehicle—and the present invention therefore relates additionally to a non-enclosed vehicle which incorporates the system. The non-enclosed vehicle, which is typically a motorcycle 10 as seen in FIG. 1, thus includes, a chassis 20, a plurality of wheels 22 associated with the chassis, an engine 24 arranged in driving association with the wheels 22; and the protective system 18.

Reference is now made to FIGS. 2A–5, of which FIGS. 2A–2G show one embodiment of the protective system 18 worn on rider 14, in a non-inflated orientation; FIGS. 3A–3G show system 18 in an inflated orientation; FIGS. 4A and 4B show the interior layer only of system 18; and FIG. 5 is a schematic cut-away view of system 18 in a spread-out position, showing the intercommunication between different portions thereof.

As seen, the main portion of protective system 18 is a garment-shaped inflatable member 30 which preferably surrounds the entire upper portion of the body from the pelvis to the neck, thereby, when inflated, providing all round protection and support. Inflatable member 30 has located therein a source of pressurized gas, preferably in the form of a plurality of pressurized gas canisters, referenced 32, preferably containing compressed air. So as to minimize the time that it takes to inflate inflatable member 30, the canisters 32 are located inside the inflatable member, and they are operated by a gas release mechanism, seen at 34. Both the gas canisters 32 and the gas release mechanisms 34 used in conjunction therewith are for one-time use and may be as used in lifejackets, for example, and they are therefore not described herein in detail. The gas release mechanism 34 is operative to rapidly inflate the inflatable member 30 in response to a sudden separation of the rider 14 from the vehicle by at least a predetermined distance which would occur as a result of a collision, as described. The succession of events starting with separation of the rider from his vehicle by a predetermined distance and leading to inflation of the inflatable member 30 and complete separation of the vehicle, are described below in conjunction with FIGS. 6A–6C.

It will be appreciated that, in order to encourage riders to use the system of the present invention, inflatable member 30 is preferably lightweight and has a garment-shaped configuration when in a non-inflated orientation. However, once inflated, in order to deflect at least a major portion of any impact forces and thereby to prevent serious injury to the rider, inflatable member 30 adopts a bulbous or generally rounded, spherical or elliptical balloon shape.

As seen in the drawings, inflatable member 30 typically has first and second inflatable portions, respectively referenced 110 and 130, for covering and protecting respective front and rear portions of the body, and a third inflatable portion, referenced 150, for covering and protecting at least the back of the rider's neck, but preferably for substantially surrounding the neck. Alternatively, inflatable member 30 can include a single portion for covering and protecting front and rear portions of the body, or several portions for covering either the front or rear portions of the body, and an additional inflatable portion for temporarily immobilizing the rider's upper spine.

Figure 3G:
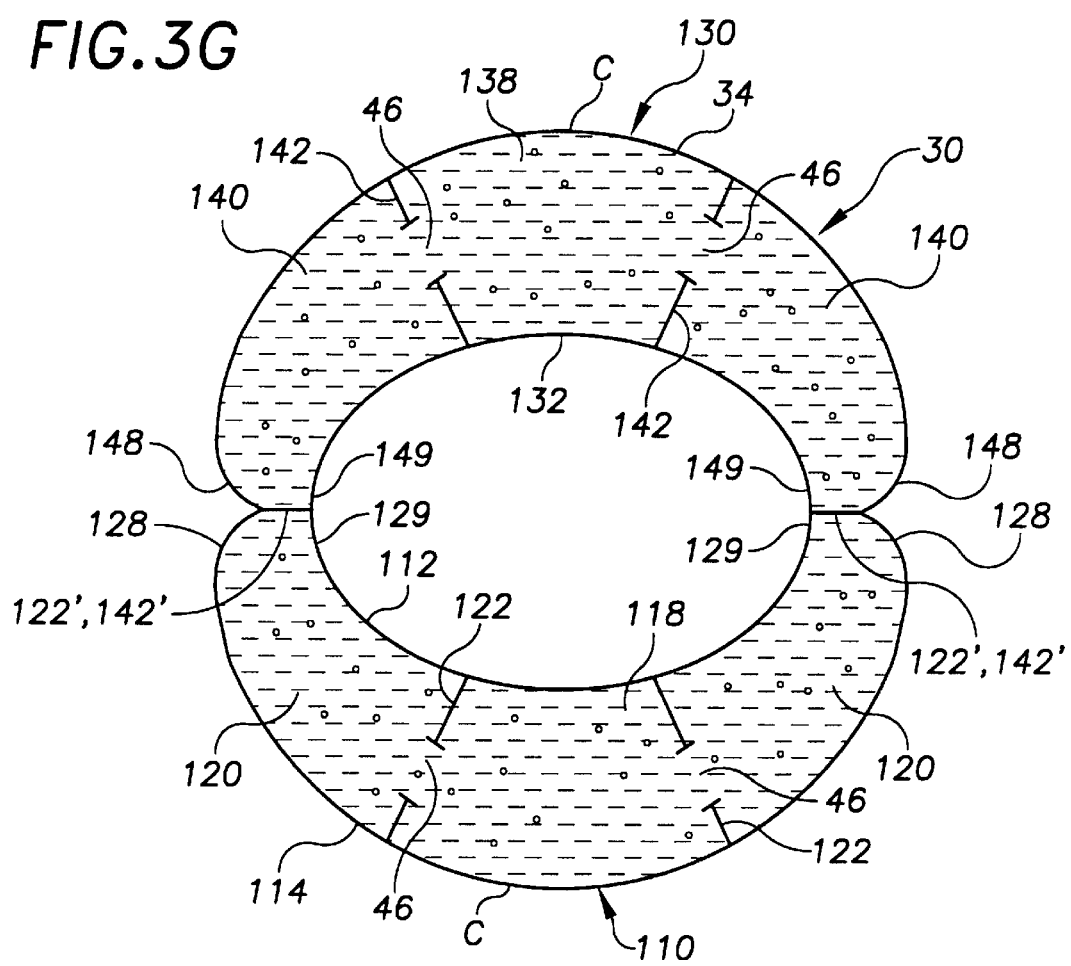
Figure 3A:
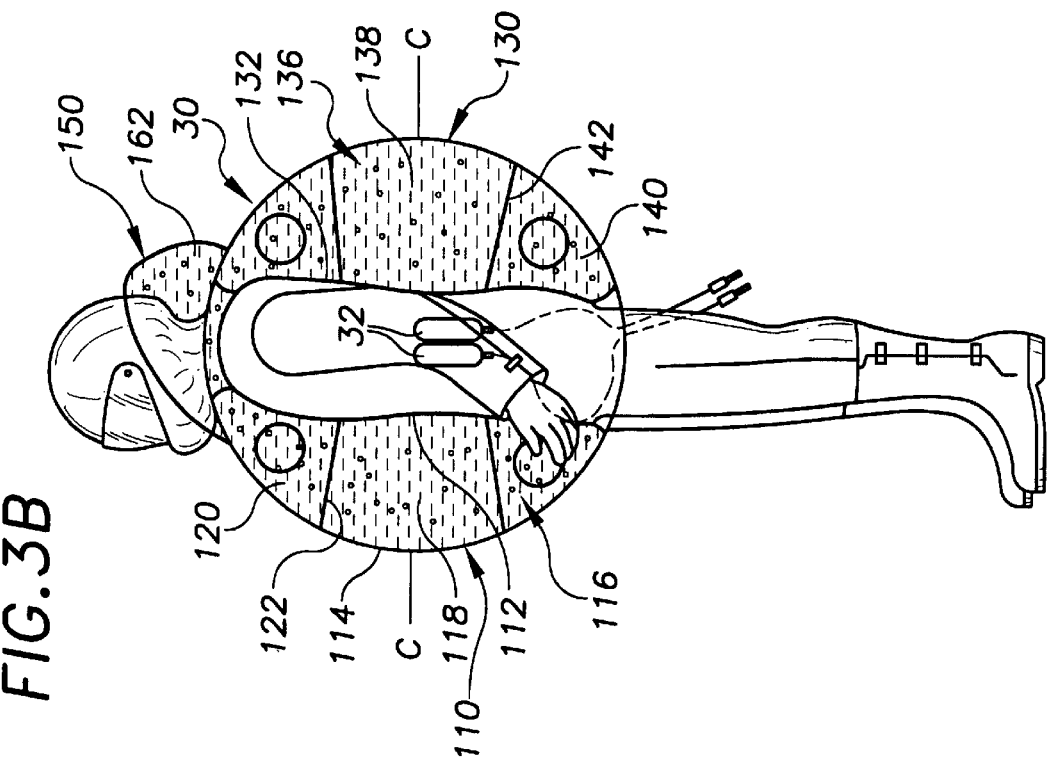
Figure 3B:
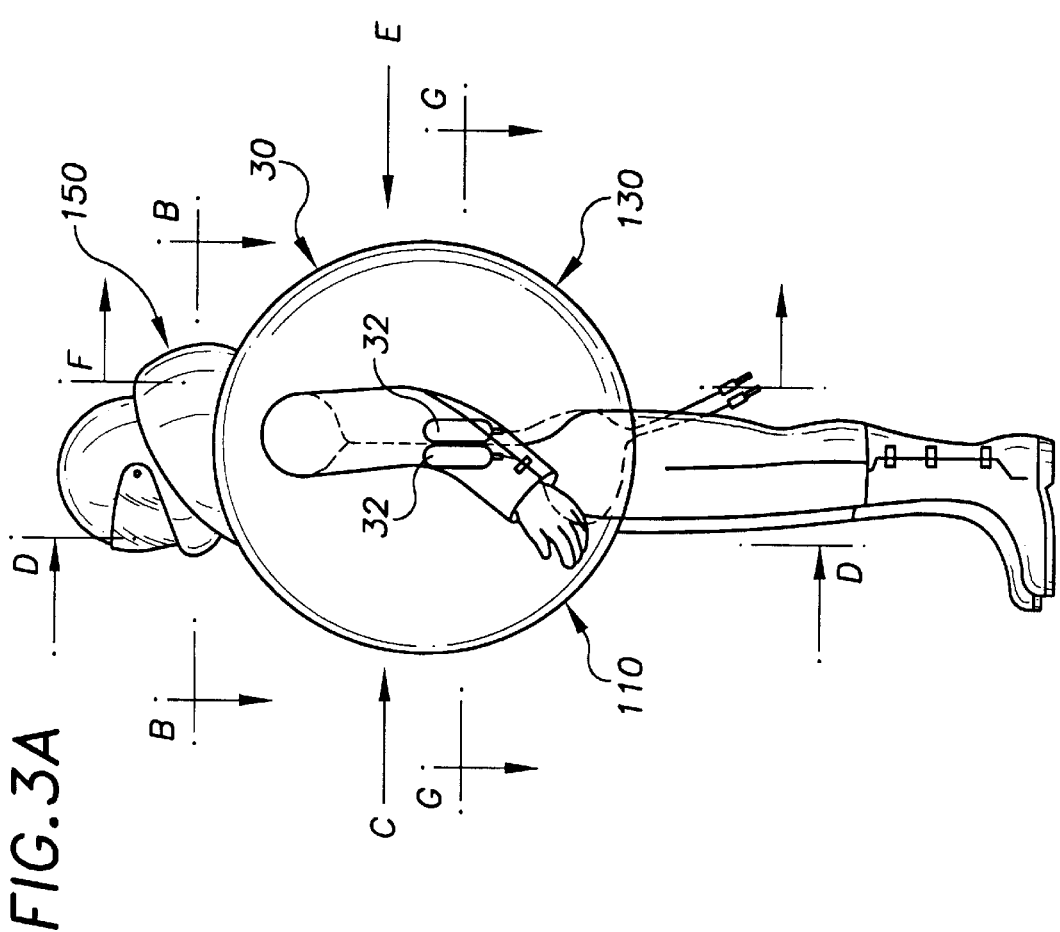
Figure 3F:
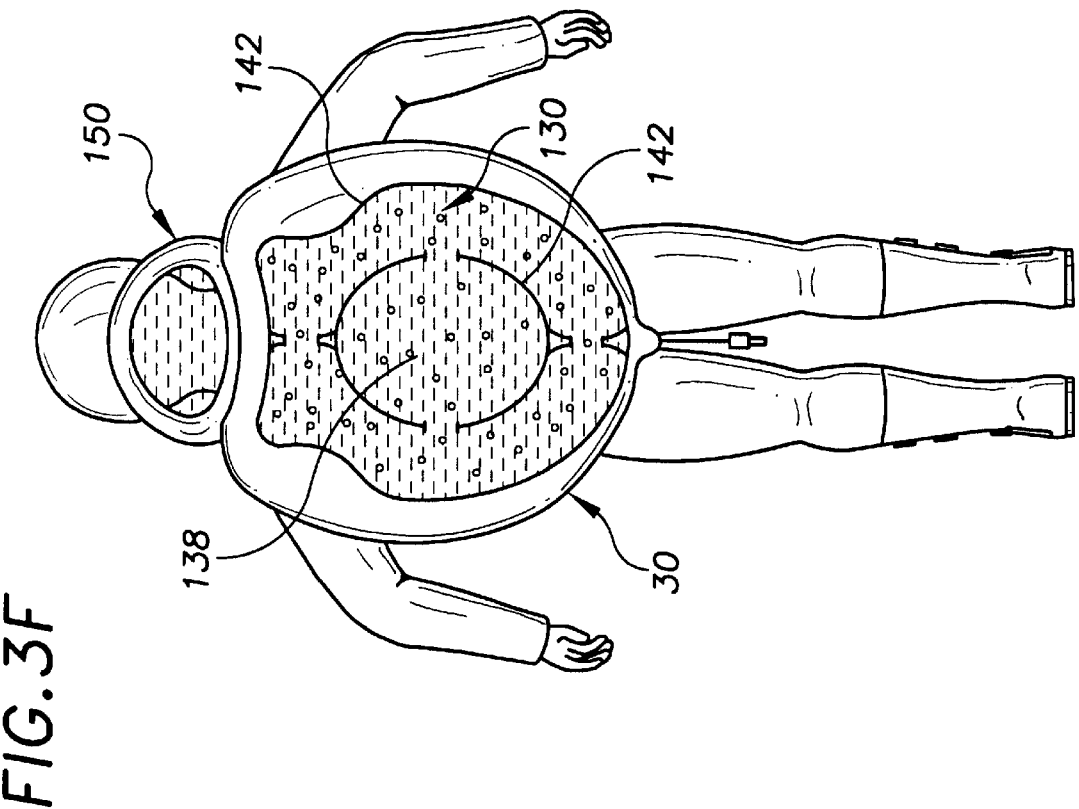
Figure 3E:
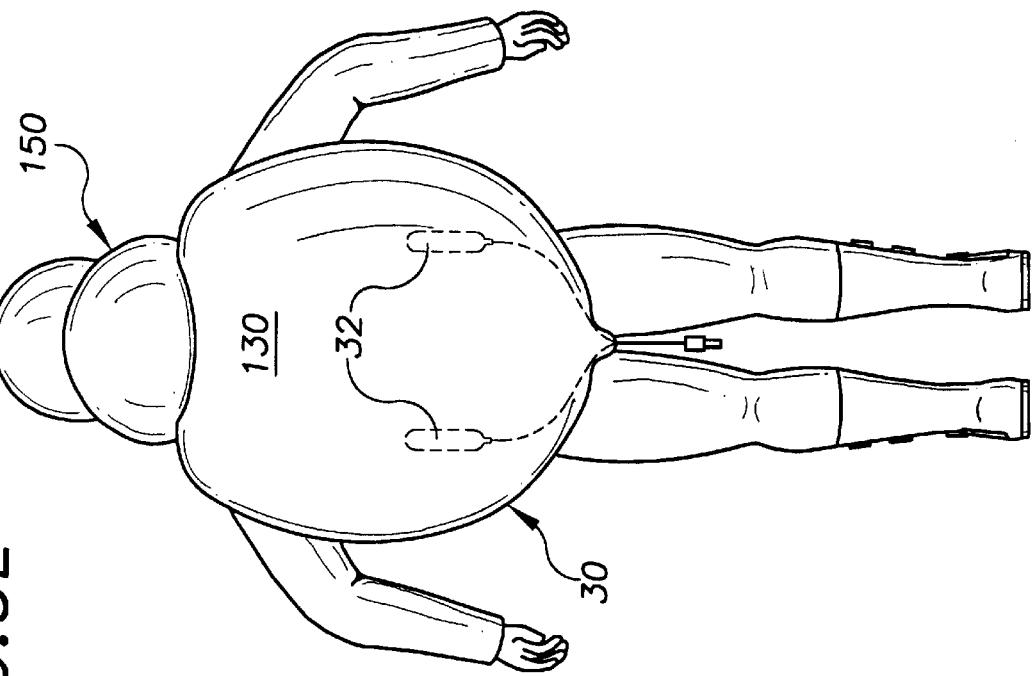

In order to ensure continuity about the shoulders of the cushion constituted by member 30, and so as to provide rapid gas communication throughout member 30 upon release of the gas from canisters 32, member 30 is provided, in the present embodiment, in an apron-like arrangement, there also preferably being provided a pair of inflatable cells 160 and 162 across the shoulders, seen in FIGS. 3B and 5. It is also seen in FIG. 5 that first and second portions 110 and 130 are arranged symmetrically about and connected via third portion 150, in which there is provided an opening 152 for insertion of the rider's head.

After placement of member 30 over the head, portions 110 and 130 are fastened to each other at the sides via any suitable fasteners, but, as shown in FIGS. 4B and 5, preferably by rapid snap-type fasteners having male and female portions, respectively referenced 36 and 38. A further pair of fasteners, referenced 40 and 42, (FIG. 5) is provided for fastening together ends of fit and second portions 110 and 130 under the crotch. So as to prevent application to the fabric of member 30 of undesired forces, and so as therefore to avoid tearing thereof, fasteners 36, 38, 40 and 42 are connected to member 30 via a plurality of webbed belt portions 44 (FIGS. 2A and 4A).

Referring now particularly to FIGS. 2B, 2D, 2F, 2G, 3B, 3D, 3F, 3G and 5, the separate portions of inflatable member 30 are formed—in the shape of sealed sacs—of a gas impermeable material, such as a rubberized fabric, or the like, which communicate only with each other, thereby to facilitate rapid inflation.

In the following description, corresponding portions of first and second portions 110 and 130 are referred to by a first reference numeral indicating that portion of first portion 110, followed by a second reference numeral in parenthesis indicting the corresponding portion of second portion 130.

It is thus seen that each of first and second portions 110 and 130 is formed of a gas impermeable interior layer 112(132) configured to lay against a predetermined portion of the rider's body; a gas impermeable exterior layer 114 (134) connected to the interior layer 112(132) so as to form therewith a substantially sealed chamber 116(136), wherein the exterior layer 114(134) is formed of a flexible material which expands in the presence of an elevated gas pressure. Preferably, the chamber 116(136) is divided into typically two gas inflatable cells 118(138) and 120(140) by a gas impermeable wall 122(142) extending laterally between and sealed to the interior and exterior layers 112(132) and 114(134). Preferably, the interior layer 112(132), which is affixed to webbed belt portions 44, is formed of a less expandable material than that of the exterior layer 114(134), such that, while inflatable member 30 expands mainly outwardly, thereby to provide the desired outwardly curved shape, a certain pressure is provided also inwardly, thereby aiding fixation of the back.

The third portion 150, for protecting the neck, has a generally tubular configuration. A rear portion 154 of third portion 150, while having a fairly compact configuration when in a non-inflated orientation, has a generally thickened and raised configuration, seen in FIGS. 3A–3F, when inflated. This thickened portion, which extends for about 270° about the neck from the mar thereof, provides considerable cushioning on impact and, further, helps to fixate the neck and back, in conjunction with the remainder of member 30. Preferably, third portion 150 is formed of a gas impermeable expandable material, similar to that of exterior layer 114(134).

Referring now particularly to FIGS. 3G and 5, it is seen that the portions 150, 160 and 162 and cells 118(138) and 120(140) of portions 110 and 130 are all interconnected via openings 46, thereby to provide gas communication therebetween and rapid inflation thereof upon release of pressurized gas from canisters 32. It is further seen that, in he present example, a plurality of four gas canisters arm provided. It will be appreciated, however, that any preferred number of gas canisters may be employed, and that any alternative suitable internal division of inflatable member 30 may be adopted.

In the illustrated embodiment, it is seen that, in each of the first and second inflatable portions 110 and 130, the gas impermeable wall 122(142) extends between the interior and exterior layers 112(132) and 114(134) such that cell 118 (138) has a generally cylindrical configuration, this being surrounded by cell 120(140) which has a generally toroidal configuration. Optionally, toroidal cell 120(140) may also be subdivided as shown.

Referring now particularly to FIGS. 3B and 3G, when inflated, the center 'C' of the exterior layer portion forming the cylindrical cell is at a maximum distance from the interior layer, and the edge portions 128(148) and 129(149) of the exterior layer and the interior layer are separated by only a minimum distance, corresponding to the height of intervening wall portion 122'(142'), such that the portion of the exterior layer between the center C and the edge portions has a curved, convex configuration.

Referring now to FIGS. 6A–6C, there is seen, in schematic form, first, inflation of inflatable member 30, and second, release thereof from vehicle 10, in response to separation of a rider wearing the member 30 from vehicle 10, by a distance exceeding a predetermined distance 'D' (FIG. 6B).

Referring initially to FIG. 6A, it is seen that, in the present embodiment, inflatable member 30 is connected to vehicle 10 by means of a cord 50. It will be appreciated from the description hereinbelow in conjunction with FIGS. 8A–9B that, in the present embodiment, and by way of example only, each pair of gas canister 34 located in the same first or second portion of the inflatable member 30 while being operated by a corresponding pair of gas release mechanism 34, has associated therewith only a single cord 50, the two pairs of gas canisters employed in the present embodiment thus requiem a corresponding pair of cords 50. In the present description of FIGS. 6A–6C, however, a single cord 50 connected to a single gas canister 32 is described, by way of illustrative example only, and the description herein is intended to cover the more specific detail provided below in conjunction with FIGS. 8A–9B.

At a first end 52, cord 50 is attached to gas release mechanism 34 and, at a second end 54, cord 50 is attached to vehicle 10 via a connector 56. A guide 58 for cord 50 is mounted onto an interior portion of inflatable member 30, there being provided a stop element 60 at a predetermined position along cord 50.

Referring now to FIG. 6B, in the event of a collision or other event which causes the rider to suddenly leave his vehicle involuntarily and under a separation force of elevated magnitude, member 30, together with gas canister 32, release mechanism 34 and cord guide 58 are moved suddenly away from vehicle 10, as shown by arrow 62. Once the predetermined separation distance D has been reached, this being, for example, between 60 cm and 1.0 m, cord 50 becomes taut, and the force of the separation (of the rider from the vehicle) is applied along cord 50, thereby to cause activation of the gas release mechanism 34 and release of gas from canister 32. After activation of the gas release mechanism, cord 50 moves downwardly through guide 58, as shown by arrow 64, until stop element 60 engages the guide and is forced to stop. At this point, the separation force is applied along cord 50 to connector 56 which, in the presence of at least a predetermined separation force, releases second end 54 of cord 50, thereby completely releasing the inflating member 30 from vehicle 10. This is indicated in FIG. 6C by arrow 66.

Figure 7A:
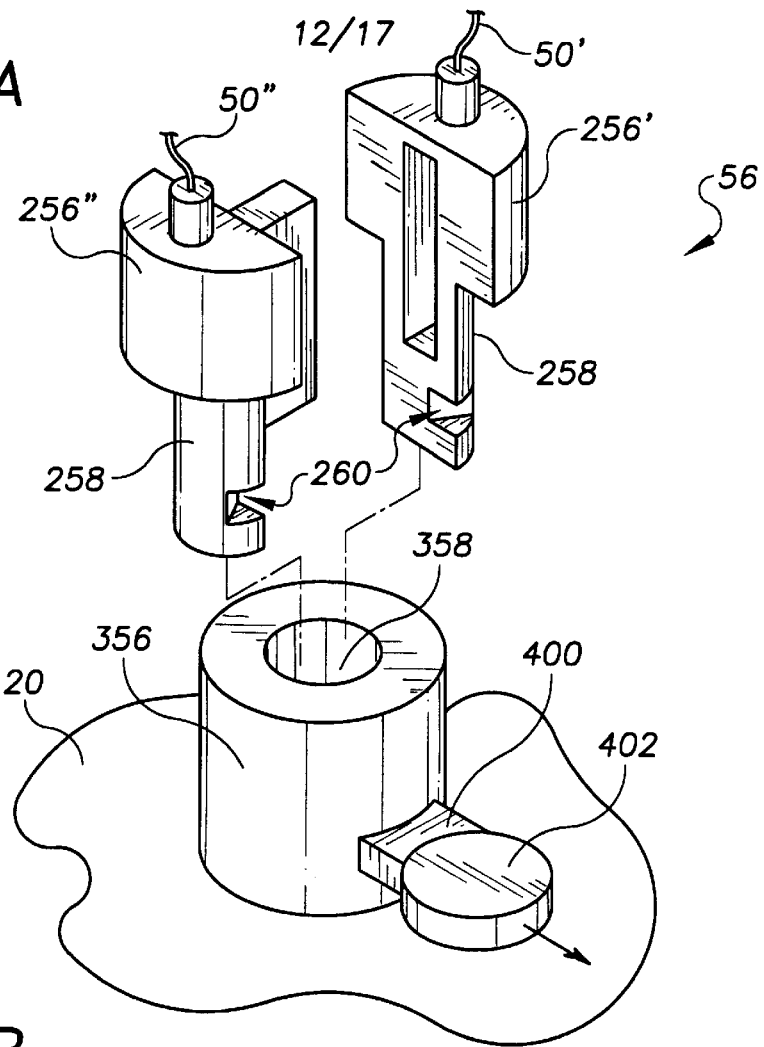
FIG. 7A is an illustration of apparatus for fastening the system of the invention to a motorcycle, in an unfastened orientation.
Figure 7B:
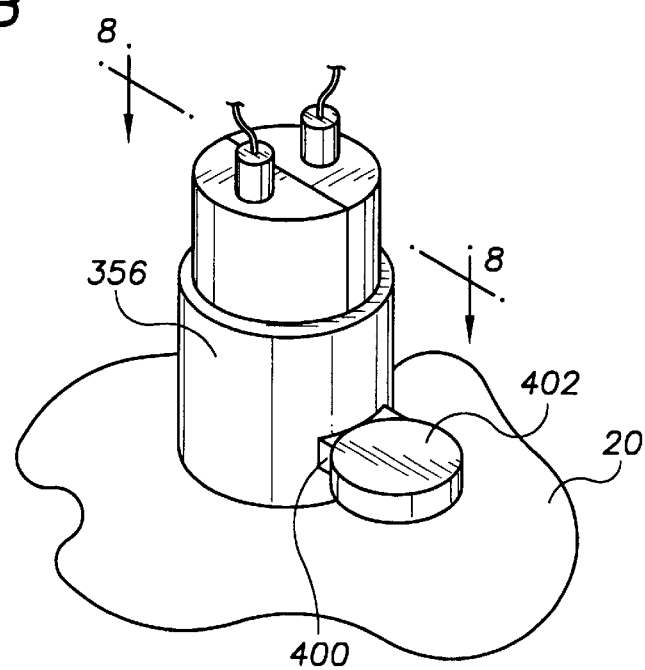
FIG. 7B is an illustration of the fastening apparatus seen in FIG. 7A, in a fastened orientation.
Figure 8A:
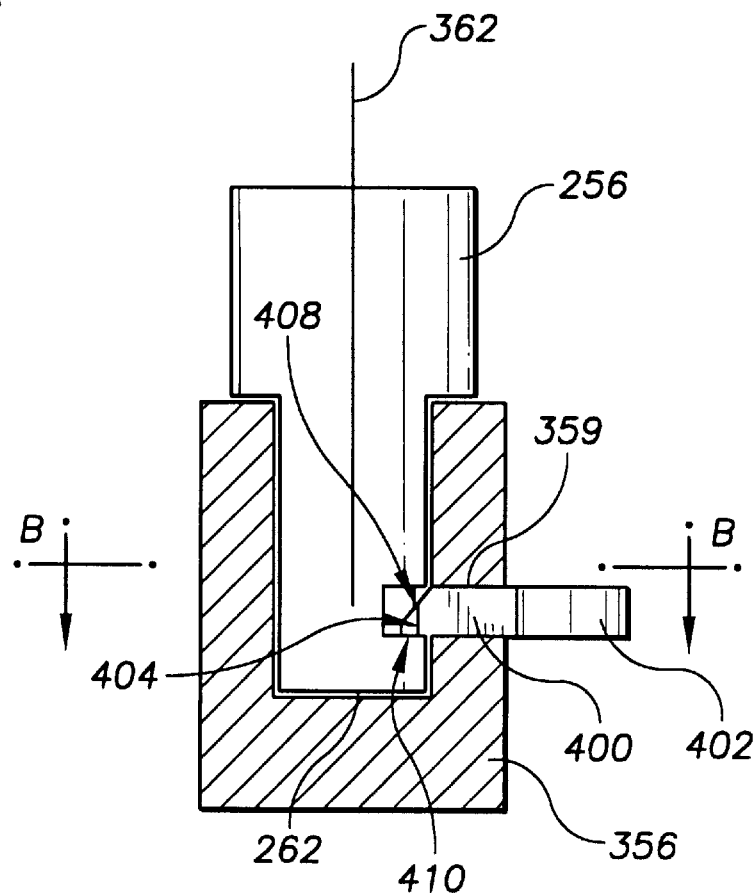
FIG. 8A is a vertical cross-section of the fastening apparatus of FIGS. 8A and 8B, taken along line 8—8 in FIG. 7B.
Figure 8B:
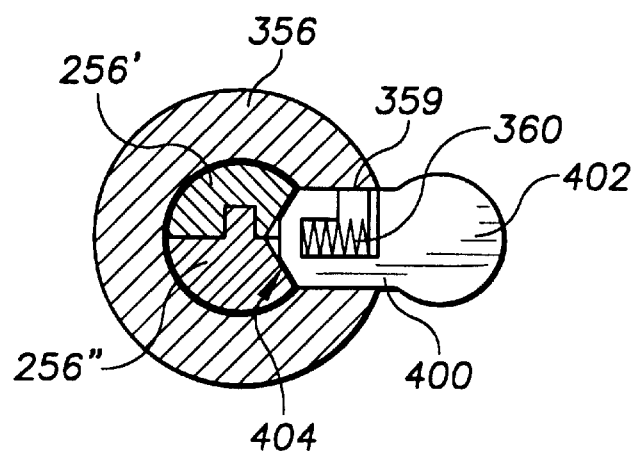
FIG. 8B is a horizontal cross-section of the fastening apparatus as seen in FIG. 8A, taken along line B—B therein.
Figure 9A:
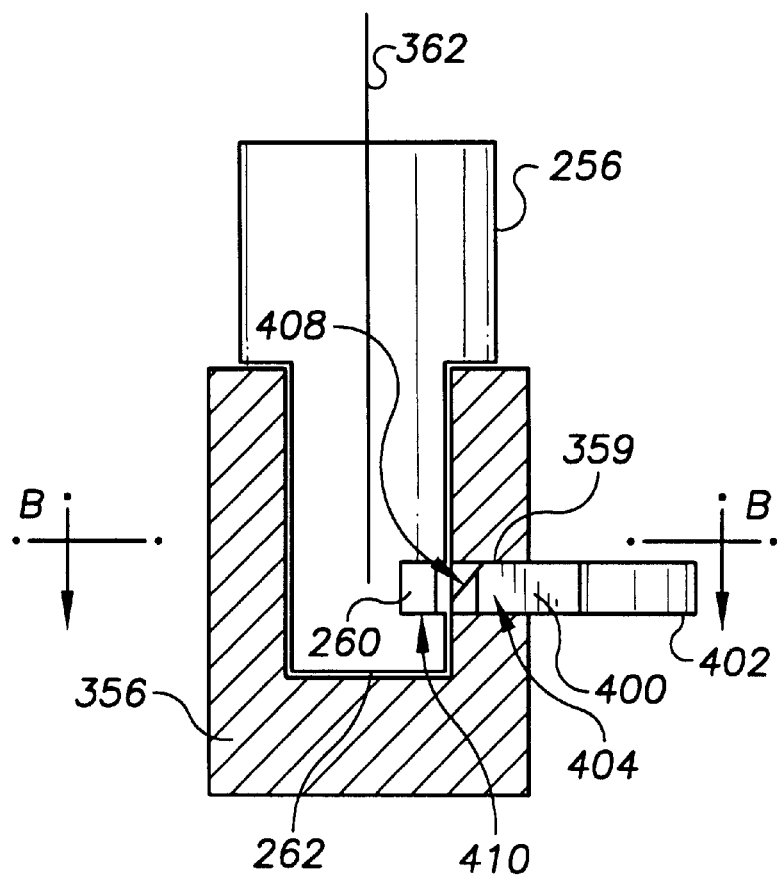
FIGS. 9A and 9B are sectional views of the fastening apparatus of FIGS. 7A–7B corresponding to the views shown in FIGS. 8A and 8B, but in a non-emergency release orientation.
Figure 9B:
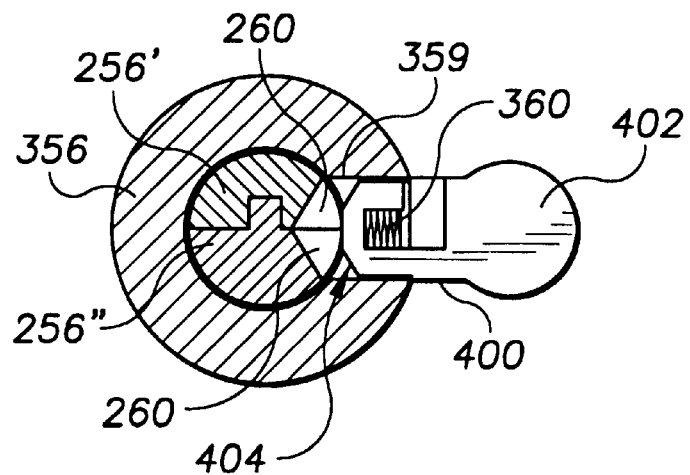

As indicated above, each pair of gas canisters 32, namely, the pair mounted in first inflatable portion 110 of inflatable member 30, and the pair mounted in second inflatable portion 130 of inflatable member 130, is connected to connector 56 by a separate cord. In FIGS. 7A and 7B these cords are respectively referenced 50' and 50".

As seen in the drawings, connector 56 has a first mating portion 356 fixedly mounted onto a predetermined vehicle portion, such as onto a portion of the chassis 20, and a pair of second mating portions, 256' and 256", respectively attached to cords 50' and 50". The second mating portions 256' and 256" are formed for connection to each other, as well as for connection to first mating portion 356.

As seen in the illustrated example, second mating portions 256' and 256" have formed thereon lower portions 258 for insertion into an opening 358 formed in first mating portion 356. A lateral key member 400 is mounted in conjunction with first mating portion 356, and has an outwardly disposed handle portion 402 and an inwardly disposed locking portion 404 which extends into opening 358 of first mating portion via a side opening 359, and which is configured for mating engagement with lower portions 258 of second mating portions 256' and 256", via appropriate notches 260 formed therein. Key member 400 is mounted for movement between a 'closed' position (FIGS. 8A and 8B), wherein it is fully extended into opening 358 in a locking position, and an 'open' position (FIGS. 9A and 9B) wherein it is fully retracted from opening 358. A resilient member 360, typically a tension spring, is provided for retaining key member 400 in a normally closed or locked position. Opening 358 defines an axis 362 along which second mating portions 256' and 256" are inserted and removed from first mating portion 356.

The inner end 404 of key member has an upper, beveled surface 408 which forms an acute angle with respect to the axis 362, and a lower surface 410 which is normal thereto. Accordingly, connection of cords 50' and 50" to the vehicle is provided by simple insertion of second mating portions 256' and 256" into first mating portion 356. As the lower edge 262 of the second mating portions engage beveled surface 408 of key member 400, it is displaced outwardly until notches 260 are brought into registration therewith, and resilient member 360 forces key member 400 into mating engagement therewith.

Subsequently, in the event of a "non-emergency" release, the first and second mating portions may be disconnected by pulling key member 400 outwardly via handle portion 402, and subsequently removing second mating portions 256' and 256" from first mating portion 356.

In the event of an "emergency" release, however, caused by a sudden separation of the rider wearing the inflatable member 30 from vehicle 10, and consequent application of at least a minimum predetermined force to connector 56 via cord 50, connector 56 is adapted to 'fail' mechanically, such that the first and second mating portions separate immediately after release of the pressurized gas.

This may be achieved in any number of ways, although, in the present invention, it is done by making second mating portions 256' and 256" from metal, and key member 400 from any suitable type of brittle plastic such that the relatively thin inner end 404 of key member 400 is frangible. Accordingly, while under normal forces, key member 400 is operative to properly lock the mating portions together, it is easily sheared through when there is applied thereto a high magnitude separation force such as results from a collision.

Figure 10A:
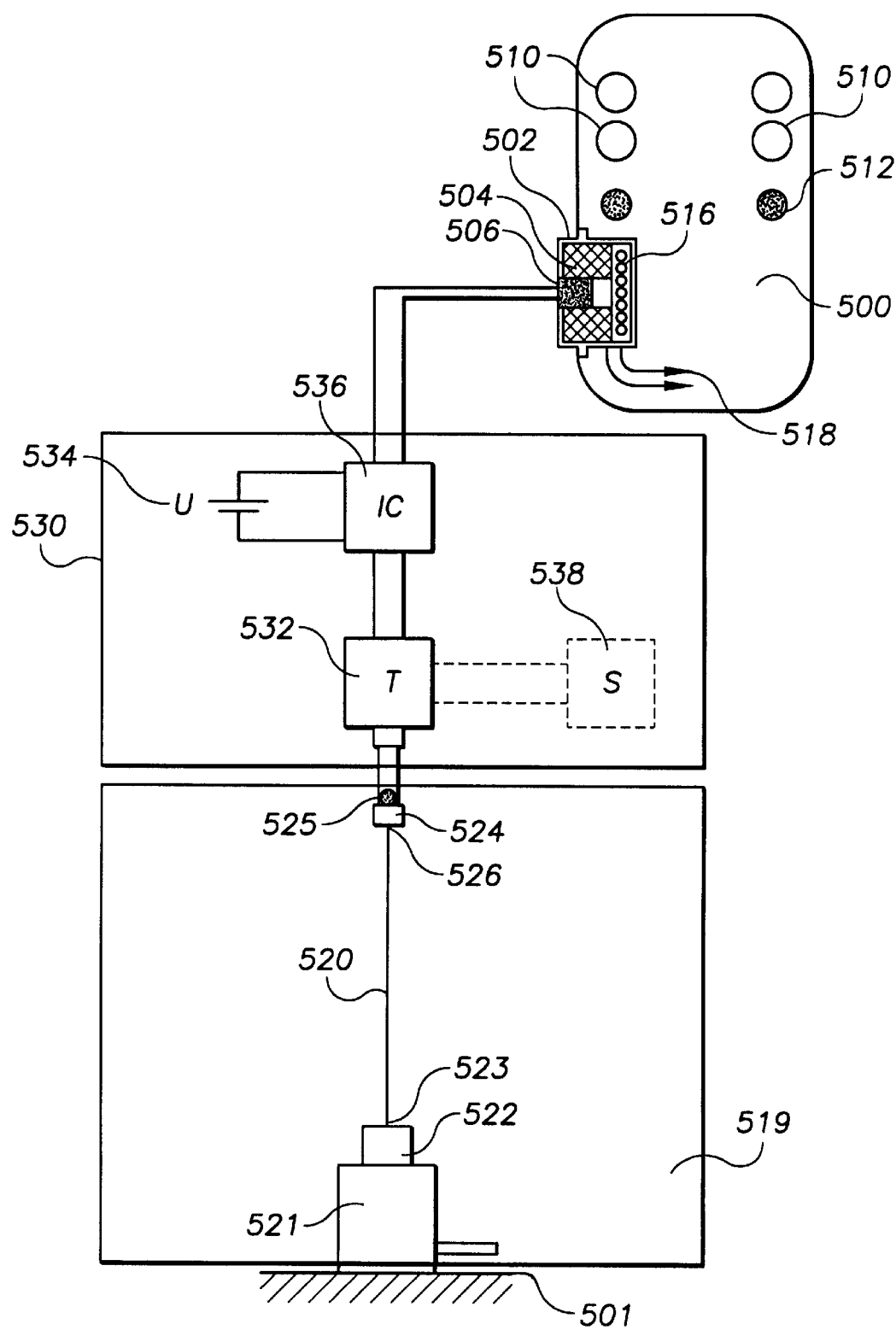
FIG. 10A is a partially cut-away schematic view of the gas source and initiator in a protective system constructed and operative in accordance with another embodiment of the invention including a pyrotechnic gas generator.

Referring now to FIG. 10A, there is shown a partially cut-away schematic view of an inflatable safety garment 500 constructed and operative in accordance with another embodiment of the invention. According to this embodiment, the gas source 502 is a pyrotechnic gas generator, similar to that used in airbags in automotive passive restraint systems. The pyrotechnic gas generator includes a pyrotechnic charge (pellets) 504 and an electrically activating squib 506 for activation of charge 504. Once the squib activates he pyrotechnic charge, gases 518 are produced within the generator and flow rapidly out of openings 516 to fill the protective garment.

Figure 10B:
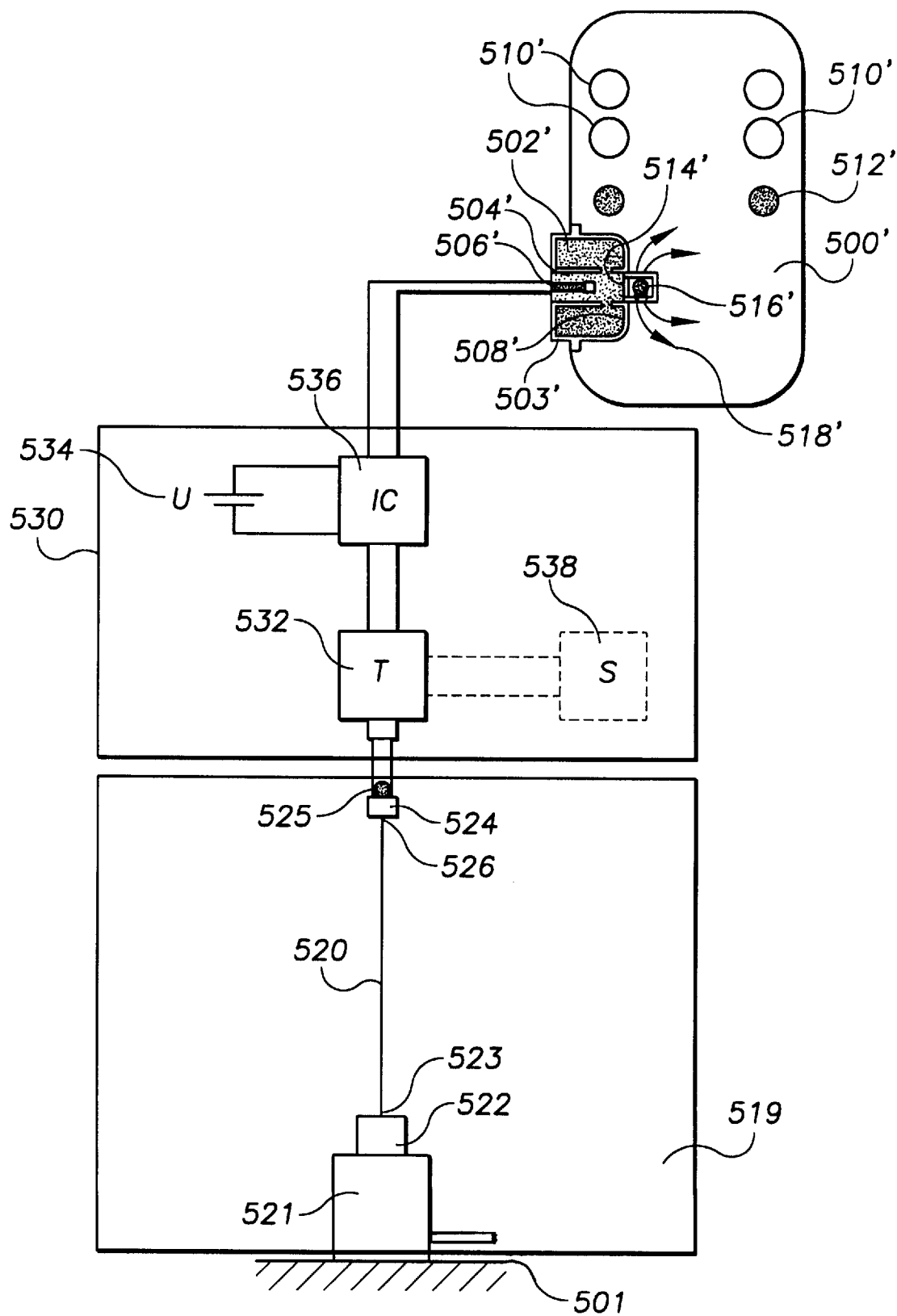
FIG. 10B is a partially cut-away schematic view of the gas source and initiator in a protective system constructed and operative in accordance with another embodiment of the invention including a hybrid gas generator.

In a preferred configuration, shown in FIG. 10B, the source of pressurized gas is a hybrid gas generator 502', such as model number DHI-3, made and manufactured by TRW Airbag Systems GmbH, Aschau/Inn, Germany. A hybrid gas generator consists of a pyrotechnic charge (pellets) 504', an electrically activating squib 506' for charge initiation, a hermetically sealed compartment 503' for storage of pressurized inert gas (nitrogen, argon, air, etc.) 508', and a breakable membrane 514' for gas release. Once the pyrotechnic charge 504' is activated by the squib 506', gases produced by the charge break the membrane 514' to permit inert gas 518' to leave the compartment faster, as well as enlarge the total volume of the gas flowing out due to thermal expansion of the hot gas mix. Once the membrane 514' is broken, gases 518' flow very rapidly out of the generator 502' through openings 516' and fill tie protective garment 500'.

The hybrid gas generator has several advantages. It has a much faster rate of inflation than a conventional pressurized gas vessel, i.e., 30–50 msec as opposed to 0.5 sec. as well as a lower ratio of mass to inflated volume than such a vessel. In this embodiment, a preferred inflatable internal volume is about 70–90 liters, with a maximum internal absolute pressure (inflated) of about 1.2–1.4 bar, depending on the shape of the garment. In comparison with the pyrotechnic-only gas generators, the hybrid generator has a much lower, and more controllable, temperature of the inflating gases. This is due to the fact that the pyrotechnic material does not actually generate the gas, as it does in the pyrotechnic-only generator. In the hybrid gas generator, it serves to heat and increase the pressure of the pressurized gas contained therein, thereby to increase the rate of inflation and the volume of the released gas. Thus, 10–20 grams of pyrotechnic material is sufficient in a hybrid generator (as opposed to 300–400 grams in pyrotechnic generators).

The lower temperature of the gases produced by the hybrid generator also provides much greater stability to the inflated garment, and, thus, lower the potential for injury to the rider wearing it. This greater stability is due to the much slower cooling of the gases inside the garment, with correspondingly slower and smaller reduction in gas volume, caused by the smaller difference between the temperature of the inflating gases and the ambient air temperature, as compared to a pyrotechnic-only gas generator.

Preferably, a number of pressure relief valves 510, known to those skilled in the art, are provided throughout the garment 500, 500'. These permit the release of excess gas pressure inside the garment in order to:

1) prevent dangerous rise of the internal pressure due to excessive gas production or general or partial over-filling of the protective member during deployment;
2) avoid a "bouncing" effect, in case of a hard impact into another vehicle or any obstacle followed by an immediate increase in the internal pressure caused by the sudden decrease of the protective member's internal volume;
3) deflate gradually the protective member after deployment.

It will be appreciated that this embodiment of the invention provides gases for inflating the garment at a higher temperature than that shown in FIG. 1. In order to prevent overheating of the body of the wearer after the impact, to remove the constraining load of the cushion to allow free motion of the wearer, and to provide free access for first aid personnel within a relatively short time after separation from the vehicle, it is preferable to provide means 512 which automatically deflates the garment a predetermined time, such as about 10 to 15 seconds, after inflation. Means 512 can include a frangible valve, known to those skilled in the art, or the pressure relief valves 510 discussed above, or any other suitable deflation means.

According to the embodiments illustrated in FIGS. 10A and 10B, the means for exposing the interior of the inflatable garment 500, 500' includes a mechanical device 519 for detecting the sudden separation of the rider, wearing the protective member 500, 500', from the vehicle 501, the gas storage and release means (gas generator) 501, 502' described above, and an electromechanical operating means 530.

Mechanical device 519 provides an utmost level of safety due to its failure-proof performance, which is not dependent on the vehicle. (In prior art systems, most failures to perform and false alarms occur at the stage of detecting the need to fire the protective system, generally due to the requirement for an electric pulse from a part of the vehicle, rather than at the actual stage of firing.)

Mechanical device 519 serves to detect an accident and to activate an electromechanical device 530 for initiation of the gas source. Mechanical device 519 includes a connector 521 fitted to the vehicle 501, a pull cord 520, a cord guide 524, a mating part 522 of the connector fixed to the lower end 523 of the cord 520, and a stop element 525 fixed to the upper portion 526 of the cord.

Electromechanical operating means 530 has several functions. First, it serves to generate a command for the system activation in response to a signal from the mechanical device 519. Second, it supplies an electric current to the gas generator 502, 502' upon the command to activate the system. It will be appreciated that the connection of the circuit is totally reliable at the time of an accident, although the electric circuit is completely separated from the gas generator until the time of activation, thus providing an ultimate level of safety for the cider.

Electromechanical operating means 530 is mounted on the protective member 500, 500' and includes a triggering device 532, a control circuit 536, and a source of electric current 534. Electric current source 534 could include various means known in the art, such as a battery, an electromechanical generator, a piezoelectric device, or any other device that contains an electric charge or is able to provide an electric pulse. The electric pulse serves to initiate operation of the pyrotechnic or hybrid gas source.

In case of an accident, the rider wearing the protective system abruptly leaves the vehicle. When the rider passes a predetermined distance from the seat, cord 520 is pulled tight between the mating part 522 of connector 521 and stop element 525, arrested by cord guide 524. The tightened cord applies a force to the cord guide 524 by means of stop element 525. When this force reaches a predetermined intensity, the cord guide transfers' the mechanical signal to the triggering device 532 and activates it.

Once activated, the triggering device immediately generates an electrical signal for the control circuit 536. Upon receiving this signal, control circuit 536 immediately makes a reliable connection between the source of electric current 534, 534' and the initiation squib 506, 506' of the gas generator 502, 502'. When the electric pulse reaches the squib, the squib activates the entire gas generator. The gas generator, in turn, produces gases 518, 518' flowing through openings 516.

In the meantime, the rider continues his motion out of the vehicle, and the force on the cord 520 continues to grow. Once the force reaches an upper predetermined limit, the frangible connector 521 on the vehicle 501 breaks and frees the mating part 522. From this moment, the system is fully disconnected from the vehicle. Gases 518, 518' fin the inflatable garment 500, 500' and provide reliable protection to the rider during an impact. Once the protective cover has fully inflated, pressure relief means 512 begins to perform as described above.

According to one embodiment of the invention, an additional accident sensor 538 is provided in protective member 500, 500'. Additional accident nor is coupled to triggering device 532 and causes triggering during an accident, in some cases before separation of the rider from the vehicle. Additional accident sensor is particularly useful for detecting certain kinds of accidents and protecting the rider against first impact. For example, such a sensor can be put on the front part of the vehicle, such as a motorcycle, to detect a frontal or head-on accident with another vehicle, such as a car, to cause earlier activation of the system in order to protect the rider against the first impact with the car roof corner (cant). Preferably additional accident sensor 538 includes an acceleration meter, although alternatively a strain gauge or any other accident sensor capable of actuating triggering device 532 can be utilized.

It will be appreciated that when the rider is not on the vehicle, the system is deactivated, so that it cannot be inflated accidentally. Safety against non-intended activation is provided in a number of ways. Connection between the source of electric current 524 and the gas generator 502, 502' cannot be produced in any way, except for activation of the control circuit 536 by triggering device 532 in case of an accident. The triggering device is able to produce the command for the control circuit only in response to the signals generated by the mechanical device 519 or the additional sensor 538. The mechanical device and the additional sensor are able to perform only when they receive an external load corresponding to the evidence of an accident, such as very high tension force and pulling speed in the cord 520, or very high acceleration or tension load in the additional sensor. These conditions cannot arise during regular everyday activity or driving of the vehicle, so non-intended initiation of the system is substantially prevented.

Figure 11:
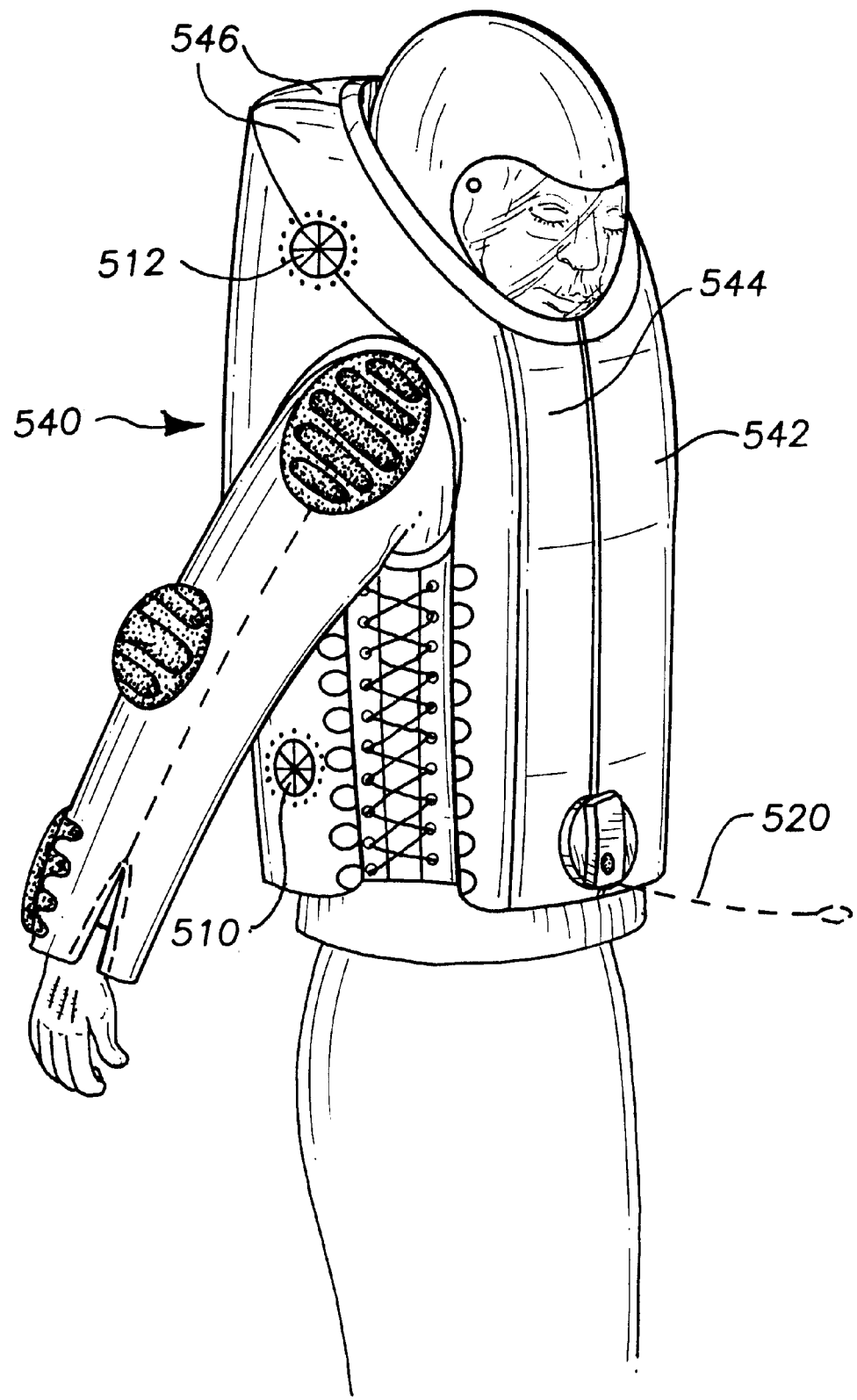
FIG. 11 is a schematic illustration of the protective system of FIG. 10A in the fully inflated orientation.

According to one embodiment of the invention, illustrated in FIG. 11, the protective garment 540 includes two portions for covering the chest and back of the rider, portion 542 covering the left side of the body and portion 544 covering the right side of the body. These portions each include portions 546 for covering and temporarily immobilizing at least the upper spine (including the neck) of the rider. As can be seen, garment 540 the expands to a rounded shape which is not a ball. This embodiment provides a protective cushion of sufficient volume to prevent injury, while significantly reducing the volume of gas and time required to fill the garment.

It will be appreciated by persons skilled in the art that the scope of the present invention is not limited by what has been shown and described hereinabove, merely by way of example. Rather, the scope of the present invention is limited solely by the claims, which follow:

What is claimed is:

1. A protective system for the rider of a non-enclosed vehicle comprising:

a garment-shaped inflatable member for surrounding at least upper portions of the body of a rider of a non-enclosed vehicle and including at least a first inflatable portion for covering and protecting front and rear portions of the body and at least a second inflatable portion for covering and temporarily immobilizing at least a second inflatable portion for covering and temporarily immobilizing at least the rider's upper spine:

a source of pressurized gas incorporated in said inflatable member;

gas release means associated with said pressurized gas: and means for exposing the interior of said inflatable member to said pressurized gas source for rapidly inflating said inflatable member in response to a sudden separation of the rider from the vehicle by at least a predetermined distance, said means for exposing including:

a connector for selectably connecting and disconnecting said inflatable member and the vehicle including a frangible element, wherein, in response to a sudden separation of the rider from the vehicle operative to apply at least a predetermined force to said connector, said connector is operative to transmit the force, first, to said gas release means so as to cause operation thereof so as to inflate said inflatable member, and subsequently, to said frangible element, thereby to cause disengagement thereof from said vehicle, thereby permitting disconnection of said inflatable member from said vehicle;

and electromechanical operating means associated with said gas release means and said connector means, including mechanical means responsive to a sudden separation of the rider from the vehicle by least a predetermined distance to actuate means for providing electric current to activate said gas release means so as to inflate said inflatable member and so as also to disconnect said inflatable member from the vehicle;

wherein said inflatable member has a garment-shaped configuration when in a non-inflated orientation, and when inflated, has an expanded, generally rounded configuration such that large magnitude concentrated forces experienced thereby on impact with an object subsequent to the sudden separation of the rider from the vehicle are prevented from transfer directly to the rider, thereby protecting the surrounded upper portions of the rider's body from serious injury.

2. The protective system according to claim 1, wherein said source of pressurized gas includes a pyrotechnic gas generator.

3. The protective system according to claim 1, wherein said source of pressurized gas includes a hybrid gas generator.

4. The protective system according to claim 1 and wherein said means for providing electric current is selected from a battery, an electromechanical generator, and a piezo-electric device.

5. The protective system according to claim 1 and wherein said electromechanical operating means includes:

a triggering device;

a control circuit coupled to said triggering device;

a source of electric current.

6. The protective system according to claim 5, and further comprising an accident sensor which, when mounted on the vehicle, is capable of actuating said trigger device.

7. The protective system according to claim 2 and wherein said means for exposing includes:

said mechanical means for detecting sudden separation of side rider from the vehicle;

said gas generator;

said electromechanical operating means for activating said gas release means in response to a signal from said mechanical means.

8. The protective system according to claim 3 and wherein said means for exposing includes:

said mechanical means for detecting sudden separation of side rider from the vehicle;

said gas generator;

said electromechanical operating means for activating said gas release means in response to a signal from said mechanical means.

9. The protective system according to claim 1 and further comprising a plurality of pressure relief valves in said inflatable member.

10. The protective system according to claim 1, and further comprising a device for deflation of said inflatable member a predetermined time after inflation.

11. The protective system according to claim 1, wherein said first and second inflatable portions include a first portion for covering and piecing a left side of the rider, a second portion for covering and protecting a right side of the rider, each of said first and second portions including portions for protecting and temporarily immobilizing the rider's upper spine.

12. A method for protecting the rider of a non-enclosed vehicle comprising:

providing a garment-shaped inflatable member for surrounding at least upper portions of the body of a rider of a non-enclosed vehicle including at least a first inflatable portion for covering and protecting front and rear portions of the body and at least a second inflatable portion for covering and temporarily immobilizing at least the rider's upper spine, in response to a sudden separation of the rider from the vehicle by at least a predetermined distance, exposing the interior of said inflatable member to gas from a pressurized gas source, thereby inflating said inflatable member, the step of exposing the interior including steps of:

applying at least a predetermined force to a connector, which includes a frangible element for selectably connecting and disconnecting said inflatable member and the vehicle, said connector transmitting the force to gas release means associated with said source of pressurized gas, thereby causing operation thereof so as to inflate said inflatable member; and after said step of transmitting, transmitting said force to said frangible element, thereby to cause disengagement of said connector, thereby permitting disconnection of said inflatable member from said vehicle; and after a predetermined amount of time, deflating said inflatable member.

13. The method according to claim 12, wherein said step of causing operation of said gas release means includes mechanically causing an electric current producing element to provide an electric current to said gas release means to actuate said gas release means and inflate said inflatable member.

14. The method according to claim 12, wherein said step of causing operation of said gas release means includes mechanically causing an accident sensor to provide an electric current to said gas release means to actuate said gas release means and inflate said inflatable member.

15. The method according to claim 12, wherein said step of exposing the interior includes fully inflating said inflatable member within about 50 msec.

* * * * *